United States Patent
Wang et al.

(10) Patent No.: US 10,742,999 B2
(45) Date of Patent: Aug. 11, 2020

(54) METHODS AND APPARATUS FOR SIGNALING VIEWPORTS AND REGIONS OF INTEREST

(71) Applicant: MediaTek Inc., Hsin-Chu (TW)

(72) Inventors: Xin Wang, San Jose, CA (US); Wang Lin Lai, San Jose, CA (US); Lulin Chen, Elk Grove, CA (US); Shan Liu, San Jose, CA (US)

(73) Assignee: MediaTek Inc., Hsin-Chu (TW)

( * ) Notice: Subject to any disclaimer, the term of this patent is extended or adjusted under 35 U.S.C. 154(b) by 107 days.

(21) Appl. No.: 15/861,503

(22) Filed: Jan. 3, 2018

(65) Prior Publication Data

US 2018/0199042 A1 Jul. 12, 2018

Related U.S. Application Data

(60) Provisional application No. 62/445,834, filed on Jan. 13, 2017, provisional application No. 62/445,282, (Continued)

(51) Int. Cl.
*H04N 19/167* (2014.01)
*H04N 19/172* (2014.01)
(Continued)

(52) U.S. Cl.
CPC ......... *H04N 19/167* (2014.11); *H04N 19/172* (2014.11); *H04N 19/597* (2014.11);
(Continued)

(58) Field of Classification Search
CPC .. H04N 19/167; H04N 19/172; H04N 19/597; H04N 21/44008; H04N 21/4728
See application file for complete search history.

(56) References Cited

U.S. PATENT DOCUMENTS 6,566,878 B1* 5/2003 Komura ........... G01R 33/56563
324/300
2007/0024706 A1 2/2007 Brannon et al.
(Continued)

FOREIGN PATENT DOCUMENTS

| CN | 104735464 A | 6/2015 |
| CN | 106060554 A | 10/2016 |
| CN | 106162177 A | 11/2016 |

OTHER PUBLICATIONS

[No Author Listed], Draft text of ISO/IEC 23009-1 $3^{rd}$ edition. ISO/IEC JTC1/SC29/WG11 N16225. Geneva, Switzerland. May 2016; 215 pages.
(Continued)

*Primary Examiner* — Santiago Garcia
(74) *Attorney, Agent, or Firm* — Wolf, Greenfield & Sacks, P.C.

(57) ABSTRACT

The techniques described herein relate to methods, apparatus, and computer readable media configured to encode or decode a region of interest associated with video data. A spherical region structure is associated with the video data that specifies the region of interest on a sphere, the spherical region structure including a reference point of the region of interest on the sphere, and data indicative of a set of side points, comprising a side point for each side of the region of interest on the sphere. The region of interest in the video data is determined based on the reference point and the set of side points. The video data can be composite video data. The spherical region structure, and/or metadata based on the spherical region structure, can be implicitly or explicitly associated with the video data.

18 Claims, 18 Drawing Sheets

Related U.S. Application Data filed on Jan. 12, 2017, provisional application No. 62/443,006, filed on Jan. 6, 2017.

(51) Int. Cl.
| | | |
|---|---|---|
| *H04N 21/81* | (2011.01) | |
| *H04N 21/44* | (2011.01) | |
| *H04N 21/6587* | (2011.01) | |
| *H04N 21/4728* | (2011.01) | |
| *H04N 19/597* | (2014.01) | |
| *H04N 19/48* | (2014.01) | |

(52) U.S. Cl.
CPC ... *H04N 21/44008* (2013.01); *H04N 21/4728* (2013.01); *H04N 21/6587* (2013.01); *H04N 21/816* (2013.01); *H04N 19/48* (2014.11)

(56) References Cited

U.S. PATENT DOCUMENTS

| | | |
|---|---|---|
| 2012/0236935 A1 | 9/2012 | Dutt et al. |
| 2014/0270374 A1* | 9/2014 | Unzueta ............. G06K 9/00248 382/103 |
| 2016/0345076 A1* | 11/2016 | Makhlouf ............ H04N 21/812 |
| 2016/0360267 A1 | 12/2016 | Marilly et al. |
| 2017/0103535 A1* | 4/2017 | Mathsyendranath ..... G06T 3/40 |
| 2018/0063482 A1* | 3/2018 | Goesnar ................... H04N 7/15 |
| 2018/0146198 A1* | 5/2018 | Atluru ................ G06K 9/00711 |
| 2018/0160123 A1* | 6/2018 | Van Der Auwera ........................ H04N 19/167 |
| 2018/0192001 A1* | 7/2018 | Boyce .................. H04N 19/597 |
| 2019/0029543 A1* | 1/2019 | Hutchinson .......... A61B 5/0077 |
| 2019/0166376 A1* | 5/2019 | Thomas ............... H04N 19/167 |
| 2019/0174150 A1* | 6/2019 | D'Acunto ............ H04N 19/167 |
| 2019/0200023 A1* | 6/2019 | Hanhart ............... H04N 19/167 |
| 2019/0238861 A1* | 8/2019 | D'Acunto ........ H04N 21/21805 |

OTHER PUBLICATIONS

[No Author Listed], Information technology—MPEG systems technologies—Part 10: Carriage of timed metadata metrics of media in ISO base media file format/ Amd 1 Carriage of spatial information. ISO/IEC JTC 1/SC 29 N 16191. Jun. 2, 2016; 8 pages.

[No Author Listed], International Standard ISO/IEC 14496-12. Fifth edition Feb. 20, 2015; 299 pages.

Hannuksela, Technologies under Consideration for ISOBMFF. ISO/IEC JTC1/SC29/WG11 MPEG2016/N16420. Chengdu, China. Oct. 2016; 10 pages.

Hughes et al., DIS of ISO/IEC 23000-19 Common Media Application Format for Segmented Media. ISO/IEC JTC1/SC29/WG11 MPEG116/N16436. Chengdu, China. Oct. 2016; 119 pages.

Thomas, Descriptions of Verification Experiments for Omnidirectional Media Application Format. ISO/IEC JTC1/SC29/WG11 N16440. Chengdu, CN. Oct. 2016; 26 pages.

Thomas, Text of ISO/IEC 23001-10:2015/FDAM 1 Carriage of spatial information. ISO/IEC JTC1/SC29/WG11 N16191. Geneva, CH. May 2016; 9 pages.

Wang et al., Canonicalization of VR Content Flow Process. ISO/IEC JTC1/SC29/WG11 MPEG2016/M39318. Chengdu, China. Oct. 2016; 7 pages.

Wang et al., Deriving Composite Tracks in ISOBMFF. ISO/IEC JTC1/SC29/WG11 MPEG2016/M39971. Geneva, CH. Jan. 2017; 10 pages.

Wang et al., ROI Signaling for VR Content. ISO/IEC JTC1/SC29/WG11 MPEG2016/M39974. Geneva, Switzerland. Jan. 2017; 9 pages.

Wang et al., Signaling for VR Viewports and ROIs in ISOBMFF using Composite Tracks. ISO/IEC JTC1/SC29/WG11 MPEG2016/M39974. Geneva, Switzerland. Jan. 2017; 5 Pages.

Wang et al., Signaling of CICP of Multiple Media Sources in DASH. ISO/IEC JTC1/SC29/WG11 MPEG2016/M39327. Chengdu, China. Oct. 2016; 7 pages.

Wang, Additional Use Cases and Requirements for ROI Signaling for VR Content. ISO/IEC JTC1/SC29/WG11 MPEG2016/M39629. Geneva, Switzerland. Jan. 2017; 6 pages.

International Search Report and Written Opinion for Application No. PCT/CN2018/071545 dated Mar. 28, 2018.

* cited by examiner

500

Sample Entry Type:    '3dsc'
Container:            Sample Description Box ('stsd')
Mandatory:            No
Quantity:             0 or 1

```
aligned(8) class
3DSphericalCoordinateSampleEntry
    extends MetadataSampleEntry ('3dsc') {
    unsigned   int(16) reference_yaw;
    unsigned   int(16) reference_pitch;
    unsigned   int(16) reference_roll;
}
```

FIG. 5B

```
aligned(8) class ROIDefinitionSample() {
    unsigned int(8) source_id;
    unsigned int(3) roi_id;
    unsigned int(8) roi_type;

unsigned int(16) yaw;
    unsigned int(16) pitch;

if (roi_type == 1) {
        unsigned int(16) radius;
    } if (roi_type == 2 || roi_type == 3 || roi_type == 4 || roi_type == 5) {
        unsigned int(16) yaw_width;
        unsigned int(16) pitch_height;
    } if (roi_type == 6) {
        unsigned int(16) num_vertices;
        for(i = 0; i < num_vertices; i++) {
            unsigned int(16) vertex_yaw;
            unsigned int(16) vertex_pitch;
        }
    } unsigned int(8) purpose;
    unsigned int(8) quality;
    unsigned int(8) ranking;

unsigned int(1) interpolate;
    unsigned int(7) reserved;
}
```

| Type 532 | Shape boundaries on sphere 534 | Signaling 536 |
|---|---|---|
| 1 | Circle | (yaw, pitch, radius) |
| 2 | Rectangular with great circles as both horizontal and vertical boundaries | (yaw, pitch, yaw_width, pitch_height) |
| 3 | Rectangular with small circles as horizontal (band), and great circles as vertical boundaries. | (yaw, pitch, yaw_width, pitch_height) |
| 4 | Rectangular with great circles in horizontal and small circles in vertical (band) | (yaw, pitch, yaw_width, pitch_height) |
| 5 | Rectangular with small circles in both horizontal and vertical (bands) | (yaw, pitch, yaw_width, pitch_height) |
| 6 | Polygon with great circles connecting two adjacent points in a (cyclic) list of n viewpoints on the sphere, where n > 2. | (yaw, pitch, yaw_1, pitch_1, ..., yaw_n, pitch_n), |
| 7 | A face of a 3D geometry type containing the projection of a point on the sphere. | (yaw, pitch) |

FIG. 5D

| Use Cases 602 | Purpose of ROI Signaling 604 | Support 606 |
|---|---|---|
| Content prefetching 610 | selecting tracks to request for pre-patching segments within the tracks | Association of an ROI with referenced tracks, and purpose of the ROI signaling as pre-fetching |
| Most viewed regions 612 | Indicating an ROI is an one with most views | Ranking of the ROI |
| Director view from artistic intent 614 | Signaling an ROI is a director view | Association of an ROI with referenced tracks, and purpose of the ROI signaling as rendering |
| Initial viewport for on-demand content 616 | Signaling an ROI as an initial view | Association of an initial ROI frame with referenced tracks, and purpose of the ROI signaling as rendering |
| Random access viewport 618 | Signaling an ROI to allow random access to it | Association of samples of an ROI with referenced tracks |
| Available views for non VR devices 620 | Signaling available ROIs | Association of the ROIs with referenced tracks, and purpose of the ROI signaling as rendering |
| Background texture 622 | Signaling ROIs and their background texture | Signaling of ROIs, and different qualities of the ROIs and background (as an ROI) |
| Close-up view (video-to-video) 624 | Signaling an ROI within another video | The ROI and video has a same source_id, and the ROI metadata is associated with the ROI video |
| Annotating 626 | ROI metadata is used for annotating another video | Association of the ROIs with referenced tracks, and purpose of the ROI signaling as annotation |
| Quality Ranking 628 | Signaling an ROI having a certain quality | Association of the ROIs with referenced tracks, and quality of the ROI signaling assigned to a quality level |
| 3D face-based ROIs 630 | Signaling an ROI being a face of a 3D geometry | Signaling a point on the sphere that can be projected to the face |

FIG. 6

METHODS AND APPARATUS FOR SIGNALING VIEWPORTS AND REGIONS OF INTEREST

RELATED APPLICATIONS

This Application claims priority under 35 U.S.C. § 119(e) to U.S. Provisional Application Ser. Nos. 62/443,006, entitled "METHODS OF SIGNALING REGIONS OF INTEREST IN VIRTUAL REALITY CONTENT IN ISOBMFF," filed on Jan. 6, 2017, 62/445,282, entitled "METHODS AND APPARATUS OF SIGNALING FOR VR VIEWPORTS AND ROIS IN ISOBMFF USING COMPOSITE TRACKS," filed on Jan. 12, 2017, and 62/445,834, entitled "METHODS AND APPARATUS OF SIGNALING OF VR VIEWPORTS AND ROIS IN DASH" filed on Jan. 13, 2017, which are herein incorporated by reference in their entirety.

TECHNICAL FIELD

The techniques described herein relate generally to video coding, and particularly to viewports and/or regions of interest in video content, including signaling and processing viewports and/or regions of interest in video content.

BACKGROUND OF INVENTION

Various types of 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangle projection can be used to put the spherical map into a two-dimensional image. This can be done, for example, to use two-dimensional encoding and compression techniques. Ultimately, the encoded and compressed content is stored and delivered using a desired delivery mechanism (e.g., thumb drive, digital video disk (DVD) and/or online streaming). Such video can be used for virtual reality (VR), and/or 3D video.

At the client side, when the client processes the content, a video decoder decodes the encoded video and performs a reverse-projection to put the content back onto the sphere. A user can then view the rendered content, such as using a head-worn viewing device. The content is often rendered according to the user's viewport, which represents the angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder does not know what the user will actually view, then the whole encoding and decoding process will process the entire spherical content. This can allow, for example, the user to view the content at any particular viewport and/or area, since all of the spherical content is delivered and decoded.

However, processing all of the spherical content can be compute intensive and can consume significant bandwidth. For example, for online streaming applications, processing all of the spherical content can place a large burden on network bandwidth. Therefore, it can be difficult to preserve a user's experience when bandwidth resources and/or compute resources are limited. Some techniques only process the content being viewed by the user. For example, if the user is viewing the front (e.g., or north pole), then there is no need to deliver the back part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for representing regions of interest (ROIs) or viewports in spherical content, and associating such ROIs or viewports with media tracks.

Some embodiments relate to a decoding method for decoding video data. The method includes receiving video data comprising a region of interest, identifying a spherical region structure associated with the video data that specifies the region of interest on a sphere, the spherical region structure including a reference point of the region of interest on the sphere and data indicative of a set of side points, comprising a side point for each side of the region of interest on the sphere, and determining the region of interest in the video data based on the reference point and the set of side points.

In some examples, determining the region of interest includes determining the data indicative of a set of side points is set to zero, and determining the region of interest corresponds to a point at the reference point.

In some examples, the data indicative of the set of side points comprises a horizontal range and a vertical range, the reference point is the center point of the region of interest, and determining the region of interest includes determining a left center point for a center of a left side of the region of interest and a right center point for a center of a right side of the region of interest based on the horizontal range, determining a top center point for a center of a top side of the region of interest and a bottom center point for a center of a bottom side of the region of interest based on the vertical range, and determining the region of interest based on four great circles that extend across each of the left, right, top, and bottom center points, wherein each great circle of the four great circles is defined by an associated two-dimensional plane that passes through the center of the sphere.

In some examples, the data indicative of the set of side points comprises a horizontal range and a vertical range, the reference point is the center point of the region of interest, and determining the region of interest includes determining a left center point for a center of a left side of the region of interest and a right center point for a center of a right side of the region of interest based on the horizontal range, determining a top center point for a center of a top side of the region of interest and a bottom center point for a center of a bottom side of the region of interest based on the vertical range, and determining the region of interest based on two great circles that extend across each of the left and right center points, wherein each great circle of the two great circles is defined by an associated two-dimensional plane that passes through the center of the sphere, and two small circles that extend across each of the top and bottom center points, wherein each small circle of the two small circles is defined by an associated two-dimensional plane that does not pass through the center of the sphere.

In some examples, at least a portion of the spherical region structure is signaled in a timed metadata track, and a track reference box in the timed metadata track associates the portion of the spherical region structure with the video data.

In some examples, the timed metadata track comprises data indicative of a type of the region of interest.

In some examples, the type of the region of interest comprises a ranking of the region of interest based on a number of views, an indication the region of interest is associated with a director's view, or some combination thereof.

In some examples, the timed metadata track comprises data indicative of a quality of the region of interest, a ranking of the region of interest, or some combination thereof.

In some examples, the received video data comprises data from a composite video track, and identifying the spherical region structure comprises identifying metadata for the spherical region structure associated with the composite video track.

In some examples, the metadata comprises a timed metadata track with metadata associated with the spherical region structure.

In some examples, the composite video track is composed based on tracks selected from a plurality of two-dimensional tile tracks, wherein each two-dimensional tile track is associated with a quality, an encryption mode, or both.

Some embodiments relate to an apparatus configured to decode video data. The apparatus includes a processor in communication with memory. The processor is configured to execute instructions stored in the memory that cause the processor to receive video data comprising a region of interest, identify a spherical region structure associated with the video data that specifies the region of interest on a sphere, the spherical region structure including a reference point of the region of interest on the sphere, and data indicative of a set of side points, comprising a side point for each side of the region of interest on the sphere, and determine the region of interest in the video data based on the reference point and the set of side points.

In some examples, determining the region of interest includes determining the data indicative of a set of side points is set to zero, and determining the region of interest corresponds to a point at the reference point.

In some examples, the data indicative of the set of side points comprises a horizontal range and a vertical range, the reference point is the center point of the region of interest, and determining the region of interest includes determining a left center point for a center of a left side of the region of interest and a right center point for a center of a right side of the region of interest based on the horizontal range, determining a top center point for a center of a top side of the region of interest and a bottom center point for a center of a bottom side of the region of interest based on the vertical range, and determining the region of interest based on four great circles that extend across each of the left, right, top, and bottom center points, wherein each great circle of the four great circles is defined by an associated two-dimensional plane that passes through the center of the sphere.

In some examples, the data indicative of the set of side points comprises a horizontal range and a vertical range, the reference point is the center point of the region of interest, and determining the region of interest includes determining a left center point for a center of a left side of the region of interest and a right center point for a center of a right side of the region of interest based on the horizontal range, determining a top center point for a center of a top side of the region of interest and a bottom center point for a center of a bottom side of the region of interest based on the vertical range, and determining the region of interest based on two great circles that extend across each of the left and right center points, wherein each great circle of the two great circles is defined by an associated two-dimensional plane that passes through the center of the sphere, and two small circles that extend across each of the top and bottom center points, wherein each small circle of the two small circles is defined by an associated two-dimensional plane that does not pass through the center of the sphere.

In some examples, at least a portion of the spherical region structure is signaled in a timed metadata track, and a track reference box in the timed metadata track associates the portion of the spherical region structure with the video data.

In some examples, the timed metadata track comprises data indicative of a type of the region of interest.

In some examples, the type of the region of interest comprises a ranking of the region of interest based on a number of views, an indication the region of interest is associated with a director's view, or some combination thereof.

In some examples, the timed metadata track comprises data indicative of a quality of the region of interest, a ranking of the region of interest, or some combination thereof.

In some examples, the received video data comprises data from a composite video track, and identifying the spherical region structure comprises identifying metadata for the spherical region structure associated with the composite video track.

In some examples, the metadata comprises a timed metadata track with metadata associated with the spherical region structure.

In some examples, the composite video track is composed based on tracks selected from a plurality of two-dimensional tile tracks, wherein each two-dimensional tile track is associated with a quality, an encryption mode, or both.

Some embodiments relate to an encoding method for encoding video data. The method includes encoding video data comprising a region of interest, comprising generating a spherical region structure that specifies the region of interest on a sphere, the spherical region structure comprising a reference point of the region of interest on the sphere, and data indicative of a set of side points, comprising a side point for each side of the region of interest on the sphere, and associating the spherical region structure with the video data to specify the region of interest in the video data.

In some examples, the method includes signaling at least a portion of the spherical region structure in a timed metadata track, such that a track reference box in the timed metadata track associates the portion of the spherical region structure with the video data.

In some examples, encoding the video data comprises encoding a composite video track, and associating the spherical region structure with the video data includes generating metadata for the spherical region structure, and associating the generated metadata with the composite video track.

In some examples, generating the metadata includes generating a timed metadata track with metadata associated with the spherical region structure.

In some examples, encoding the composite video track includes encoding the composite video track based on tracks selected from a plurality of two-dimensional tile tracks, wherein each two-dimensional tile track is associated with a quality, an encryption mode, or both.

Some embodiments relate to an apparatus for encoding video data. The apparatus includes a processor in communication with memory. The processor is configured to execute instructions stored in the memory that cause the processor to encode video data comprising a region of interest, comprising generating a spherical region structure that specifies the region of interest on a sphere, the spherical region structure including a reference point of the region of interest on the sphere, and data indicative of a set of side points, comprising a side point for each side of the region of interest on the sphere, and associating the spherical region structure with the video data to specify the region of interest in the video data.

In some examples, the processor is configured to execute instructions stored in the memory that cause the processor to signal at least a portion of the spherical region structure in a timed metadata track, such that a track reference box in the timed metadata track associates the portion of the spherical region structure with the video data.

In some examples, encoding the video data comprises encoding a composite video track, and associating the spherical region structure with the video data includes generating metadata for the spherical region structure, and associating the generated metadata with the composite video track.

In some examples, generating the metadata includes generating a timed metadata track with metadata associated with the spherical region structure.

In some examples, encoding the composite video track comprises encoding the composite video track based on tracks selected from a plurality of two-dimensional tile tracks, wherein each two-dimensional tile track is associated with a quality, an encryption mode, or both.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 5A shows a 3D spherical coordinate sample entry, according to some embodiments.

FIG. 5B shows a 3D spherical coordinate sample entry class, according to some embodiments.

FIG. 5C shows an example of an ROI syntax, according to some embodiments.

FIG. 5D is a table that shows a type of ROI, a description of the shape boundaries on the sphere for the ROI, and associated signaling for the ROI, according to some embodiments.

FIG. 6 shows a table of exemplary ROI use cases, according to some embodiments.

DETAILED DESCRIPTION OF INVENTION

Figure 1:
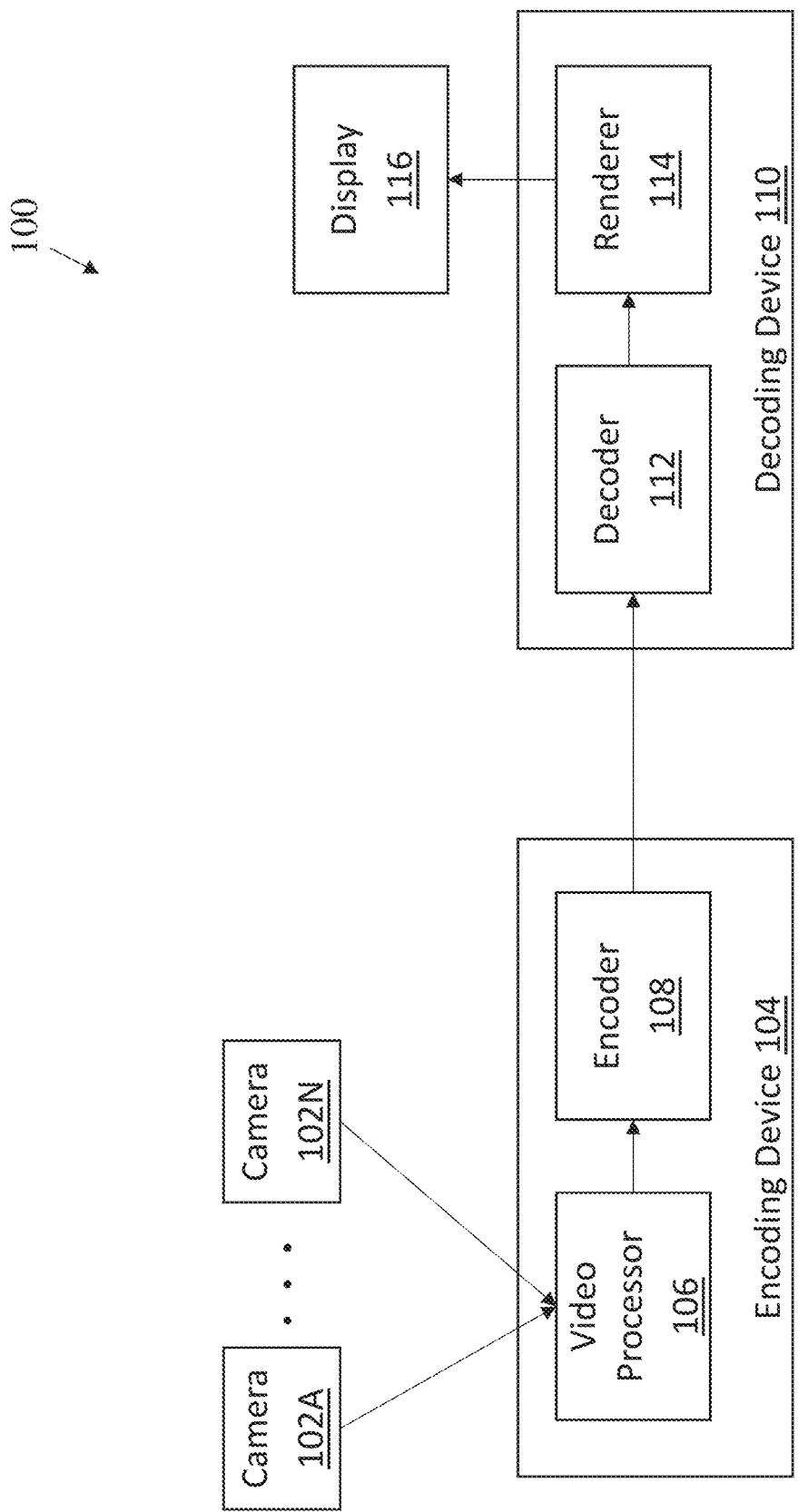
FIG. 1 shows an exemplary video coding configuration, according to some embodiments.

Various techniques can be used to represent regions of interest (ROIs) and/or viewports, and to signal such ROI representations, including in composite tracks of file formats (e.g., ISOBMFF) as well as in streaming formats (e.g., MPEG DASH).

A way is needed to represent ROIs/viewports in spherical content (e.g., 3D content). The techniques disclosed herein provide for representing ROIs/viewports in spherical content, such as circular ROIs, rectangular ROIs, polygonal ROIs, and/or the like. The ROIs can be defined with reference to the 3D sphere. The techniques disclosed herein can therefore extend ROIs to, for example, 3D content, such as VR content. For example, the techniques can be used to extend ROIs to content that is high efficiency video coding (HEVC) tile-based content, scalable video coding (SVC)-based content, sub-picture based content (e.g., like in 360 degree video), and/or multi-source based content (e.g., like in FTV). The techniques provide for identifying whether the 3D video content includes ROI(s), as well as identifying the ROI content. For example, content can be coded into tiles (e.g., subpictures). The techniques discussed herein can be used to support viewport dependent processing that determines the particular tiles associated with an ROI or a user's viewport, and only delivers those tiles. The inventors have appreciated that the ROI/viewport representations for spherical content need to be associated with base content. The techniques disclosed herein provide for associating such ROI content implicitly or explicitly.

ROI and viewport information can be signaled within either timed metadata tracks or video track metadata. However, in some situations it may be undesirable (and/or not feasible) to associate timed metadata tracks or video track metadata with individual media tracks when these media tracks carry content of respective tiles or subpictures. To avoid such difficulties, the techniques described herein provide for signaling the viewport or ROI using a composite track. The techniques provide for associating timed metadata tracks and/or video track metadata with corresponding composite tracks. For example, a viewport/ROI can be explicitly signaled for 3D spherical content, e.g., via an association of a viewport/ROI timed metadata track and the 3D content derived via composite tracks.

As discussed herein, file and streaming format types include ISOBMFF and MPEG DASH. When VR content is delivered using MPEG DASH, many use cases (e.g., most used ROIs, director ROIs, etc.) often require signaling viewports and ROIs within an MPD for the VR content. This can help the decoder/client to decide which, if any, viewports and ROIs to deliver and render. Existing streaming formats including DASH may not support signaling viewports/ROIs represented using the techniques disclosed herein (e.g., for spherical content). In order to signal a viewport or ROI representation in DASH, the techniques described herein associate a metadata representation with a media representation of a composite (fragmented) track in file format. The DASH media representation can include a dependency on the representations corresponding to the variant tracks that the composite track is derived from.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a portion of a head-worn display, or any other apparatus with decoding capability. The decoding device 110 includes a decoder 112 that is configured to decode the encoded video. The decoding device 110 also includes a renderer 114 for rendering the two-dimensional content back to a sphere. The display 116 displays the rendered content from the renderer 114.

A region of interest (ROI) is somewhat similar in concept to viewport. An ROI may, for example, represent a region in 3D or 2D encodings of omnidirectional video. An ROI can have different shapes (e.g., a square, or a circle), which can be defined in relation to the 3D or 2D video (e.g., based on location, height, etc.). For example, a region of interest can represent an area in a picture that can be zoomed-in, and corresponding ROI video can be displayed for the zoomed-in video content. In some implementations, the ROI video is already prepared. In such implementations, a region of interest typically has a separate video track that carries the ROI content. Thus, the encoded video specifies the ROI, and how the ROI video is associated with the underlying video.

ROI or viewport tracks, such as statically constructed ROI tracks, can be associated with main video. For example, an ROI can be associated with a main video to facilitate zoom-in and zoom-out operations, where the ROI is used to provide content for a zoom-in region. For example, MPEG-B, Part 10, entitled "Carriage of Timed Metadata Metrics of Media in ISO Base Media File Format," dated Jun. 2, 2016 (w16191), which is hereby incorporated by reference herein in its entirety, describes an ISO Base Media File Format (ISOBMFF) file format that uses a timed metadata track to signal that a main 2D video track has a 2D ROI track. As another example, Dynamic Adaptive Streaming over HTTP (DASH) includes a spatial relationship descriptor to signal the spatial relationship between a main 2D video representation and its associated 2D ROI video representations. ISO/IEC 23009-1, draft third edition (w16225), Jul. 29, 2016, addresses DASH, and is hereby incorporated by reference herein in its entirety.

The techniques described herein provide for dynamic ROIs and/or viewports (e.g., in response to a user's selected ROI and/or viewport). The techniques disclosed herein extend ROIs to, for example, 3D content, such as VR content. For example, the techniques can be used to extend ROIs to content that is high efficiency video coding (HEVC) tile-based content, scalable video coding (SVC)-based content, sub-picture based content (e.g., like in 360 degree video), and/or multi-source based content (e.g., like in FTV). The techniques provide for identifying whether the 3D video content includes ROI(s), as well as identifying the ROI content. For example, content can be coded into tiles (e.g., subpictures). The techniques discussed herein can be used to support viewport dependent processing that determines the particular tiles associated with an ROI or a user's viewport, and only delivers those tiles.

When signaling an ROI, various information may be generated, including information related to characteristics of the ROI (e.g., identification, type (e.g., location, shape, size), purpose, quality, rating, etc.). Information may be generated to associate content with an ROI, including with the visual (3D) spherical content, and/or the projected and mapped (2D) frame of the spherical content. An ROI can be characterized by a number of attributes, such as its identification, location within the content it is associated with, and its shape and size (e.g., in relation to the spherical and/or 3D content). Additional attributes like quality and rate ranking of the region can also be added, as discussed further herein.

Figure 3B:
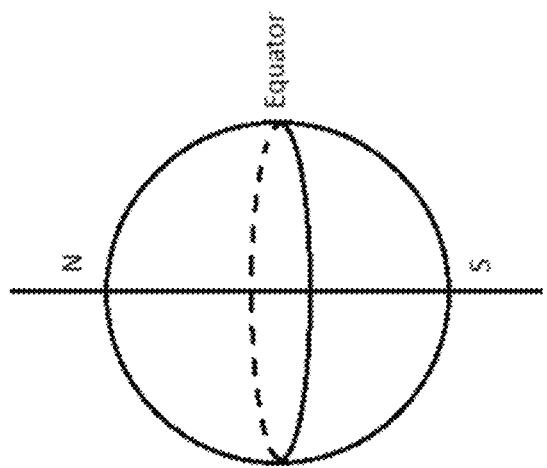
FIG. 3B shows the north (N) and south (S) poles of a sphere, according to some examples.
Figure 3A:
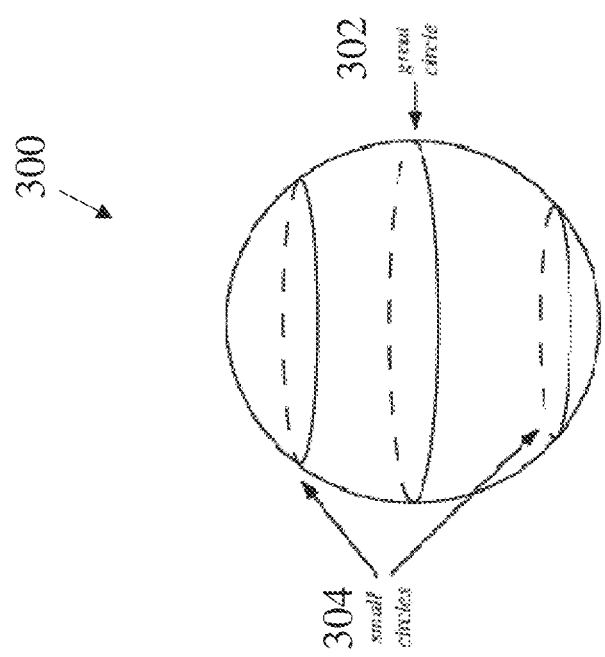
FIG. 3A shows a sphere with one great circle and two small circles, according to some examples.

In some embodiments, in order to specify the shape and size of an ROI on the sphere, certain spherical notions can be used. FIG. 3A shows a sphere 300 with one great circle 302 and two small circles 304. As shown, the great circle 302 spans the intersection of the spherical surface with a 2D plane (not shown) passing through the center of the sphere 300. Thus, the great circle 302 is a section of the sphere 300 that contains a diameter of the sphere 300. The small circles 304 show the intersection of the spherical surface with a 2D plane (not shown) that does not pass through the center of the sphere 300, and therefore each is associated with a section of the sphere 300 that does not contain a diameter of the sphere 300.

Figure 3C:
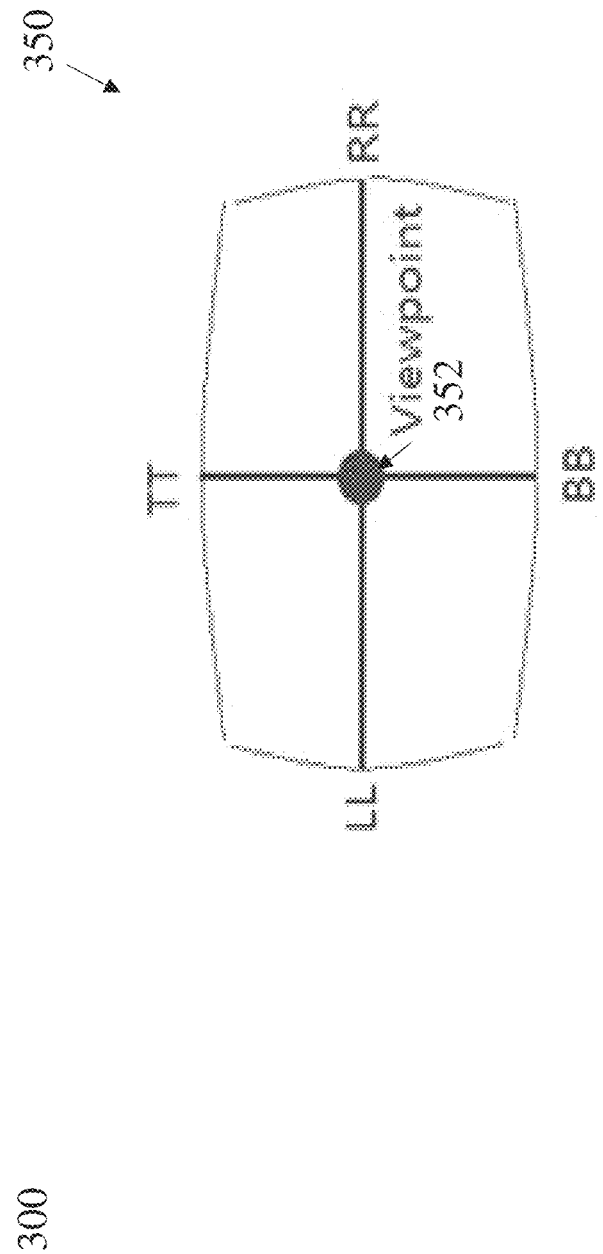
FIG. 3C shows an ROI with a generally rectangular shape, according to some embodiments.

There can be a number of different ways to join, or to connect using a line, two points on a sphere using great and/or small circles. Any two points on the sphere can be joined by a segment of a unique great circle, which provides the shortest path between them on the sphere. The two points can also be joined by (e.g., an infinite number of) small circles intersected by 2D planes containing the two points. When using small circles, the path between the two points becomes unique when the 2D plane is fixed (e.g., fixed orthogonal to a particular axis of the sphere). For exemplary purposes, the descriptions of the viewports that follow assume that the north (N) and south (S) poles shown in FIG. 3B are fixed, together with a default coordinate system for yaw, pitch and roll (not shown). Each ROI can have an ROI center, which is a point on the sphere, defined as a viewpoint using its pitch and yaw to indicate that the ROI is the region on the sphere containing the viewpoint. For example, FIG. 3C shows an ROI 350 with a generally rectangular shape, according to some embodiments. The ROI 350 includes a viewpoint 352 as its center. The ROI 350 includes two points along the horizontal direction: the left point (LL) that is at a center of the left side of the viewpoint, and the right point (RR) that is at a center of the right side of the viewpoint. The ROI 350 includes two points along the vertical direction: the top point (TT) that is at a center of the top side of the viewpoint, and the bottom point (BB) that is at a center of the bottom side of the viewpoint.

FIGS. 4A-4E, which are discussed further below, show exemplary representations of ROI shapes, according to some embodiments. As discussed herein, in some embodiments, the ROI can take the shape of a rectangle. Other shapes can be used as well, such as circles, triangles, three-dimensional shapes, and the like. Some embodiments provide techniques to describe such various ROIs using a list of characteristics to define the viewport with different shapes, locations, and/or other additional information regarding the ROIs, as discussed further herein.

A rectangular ROI can be expressed in various ways. For example, a rectangular area can be described on the surface of the sphere, which can be expressed using small circles, large circles, and/or a combination of small and large circles. FIG. 4A shows a rectangular ROI 410, according to some embodiments. The rectangular ROI 410 has its center viewpoint 410A at (yaw, pitch) (e.g., which can be specified in respect to an underlying default coordinate system as discussed above, and not shown). Rectangular ROI 410 has horizontal and vertical boundaries on great circles. A first great circle 410B intersects point LL, a second great circle 410C intersects point RR, a third great circle 410D intersects point TT, and a fourth great circle 410E intersects point BB. The rectangular ROI 410 has a width defined along the points (LL-Viewpoint-RR), which may be taken as yaw_width. The rectangular ROI 410 has a height defined along the points (TT-Viewpoint-BB), which may be taken as pitch_height. In some embodiments, the rectangular ROI 410 can be signaled by yaw, pitch, yaw_width, and pitch_height. The value of yaw_width can specify the width between the vertical boundaries. The value of pitch_height can specify the height between the horizontal boundaries.

Figure 4B:
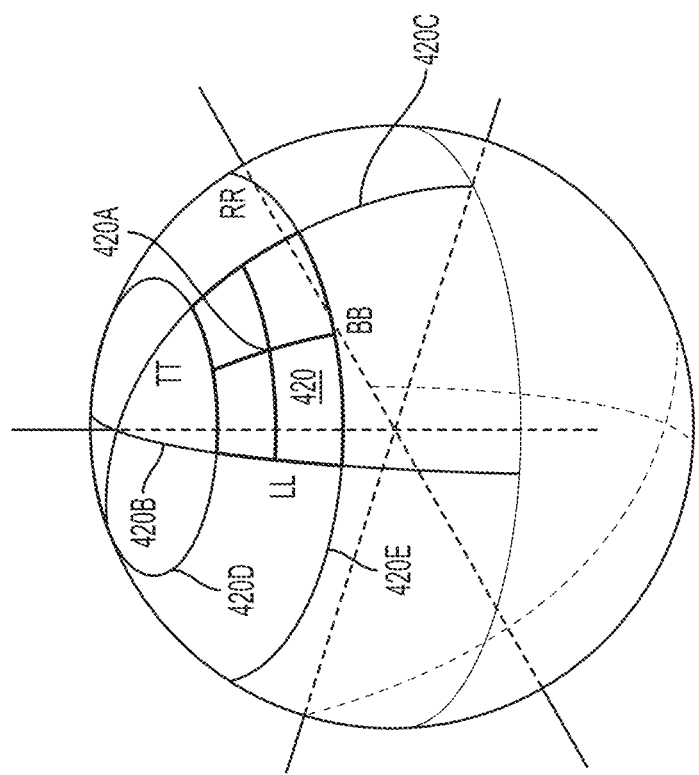
FIG. 4B shows a second rectangular ROI, according to some embodiments.
Figure 4A:
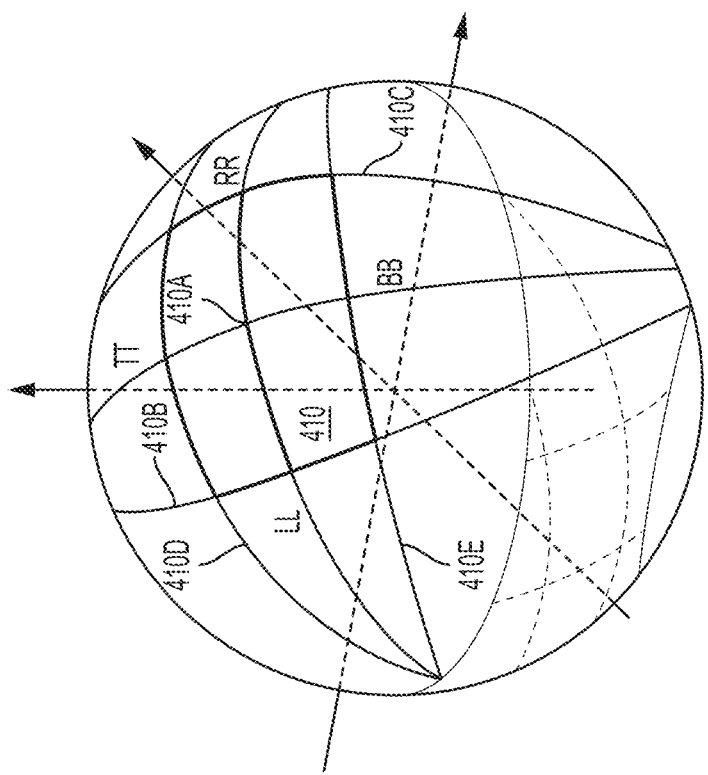
FIG. 4A shows a rectangular ROI, according to some embodiments.

FIG. 4B shows a second rectangular ROI 420, according to some embodiments. The rectangular ROI 420 has its center viewpoint 420A at (yaw, pitch). The rectangular ROI 420 has vertical boundaries on great circles. A first great circle 420B intersects point LL, and a second great circle 420C intersects point RR. The rectangular ROI 420 has horizontal boundaries on small circles. A first small circle 420D intersects point TT, and a second small circle 420E intersects point BB. The rectangular ROI 420 has a height defined along the (TT-Viewpoint-BB), which may be taken as pitch_height. The rectangular ROI 420 has a width defined along the points (LL-Viewpoint-RR)), which may be taken as yaw_width. In some embodiments, the rectangular ROI 420 can be signaled by yaw, pitch, yaw_width, and pitch_height. The value of yaw_width can specify the width between the vertical boundaries. The value of pitch_height can specify the height between the horizontal boundaries.

In some embodiments, a rectangular ROI can be represented by swapping the use of great and small circles to what is shown in FIG. 4B. For example, great circles can be used in the horizontal direction (e.g., band), and small circles can be used in the vertical direction (e.g., band). Such an exemplary ROI can have its center viewpoint at (yaw, pitch), and horizontal boundaries on great circles with the height (TT-Viewpoint-BB) between the horizontal boundaries being pitch_height, and vertical boundaries on small circles with the width (LL-Viewpoint-RR) between the vertical boundaries being yaw_width. This exemplary ROI can be signaled using (yaw, pitch, yaw_width, pitch_height).

In some embodiments, a rectangular ROI can be represented using small circles in both horizontal and vertical directions (e.g., bands). Such an exemplary rectangular ROI has its center viewpoint at (yaw, pitch), and horizontal and vertical boundaries on small circles with the width (LL-Viewpoint-RR) between the vertical boundaries being yaw_width, and the height (TT-Viewpoint-BB) between the horizontal boundaries being pitch_height. This exemplary ROI can be signaled as (yaw, pitch, yaw_width, pitch_height).

In some embodiments, the rectangular ROIs discussed herein can be specified using other techniques. For example, a rectangular ROI can be specified using (yaw, pitch, yaw_left, yaw_right, pitch_top, pitch_bottom), where the center is at (yaw, pitch) and the LL, RR, TT and BB points of the ROI are defined by yaw_left, yaw_right, pitch_top and pitch_bottom, respectively. For example, LL is at (yaw_left, pitch_bottom+(pitch_top-pitch_bottom)/2).

Figure 4D:
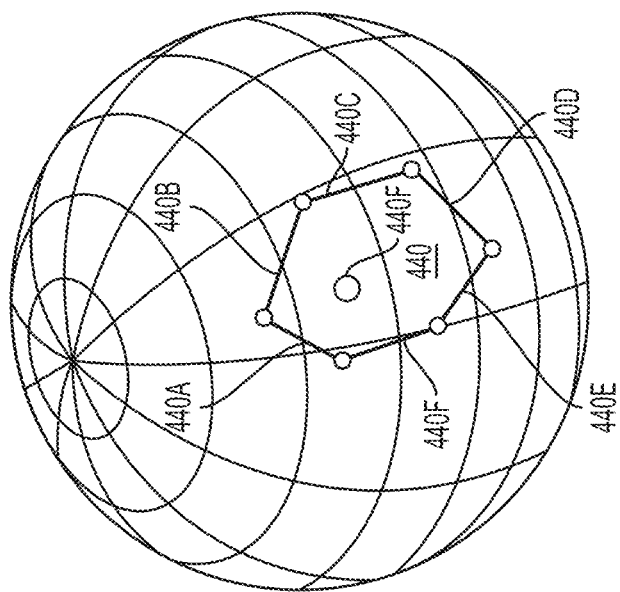
FIG. 4D shows an ROI represented by a polygon, according to some embodiments.
Figure 4C:
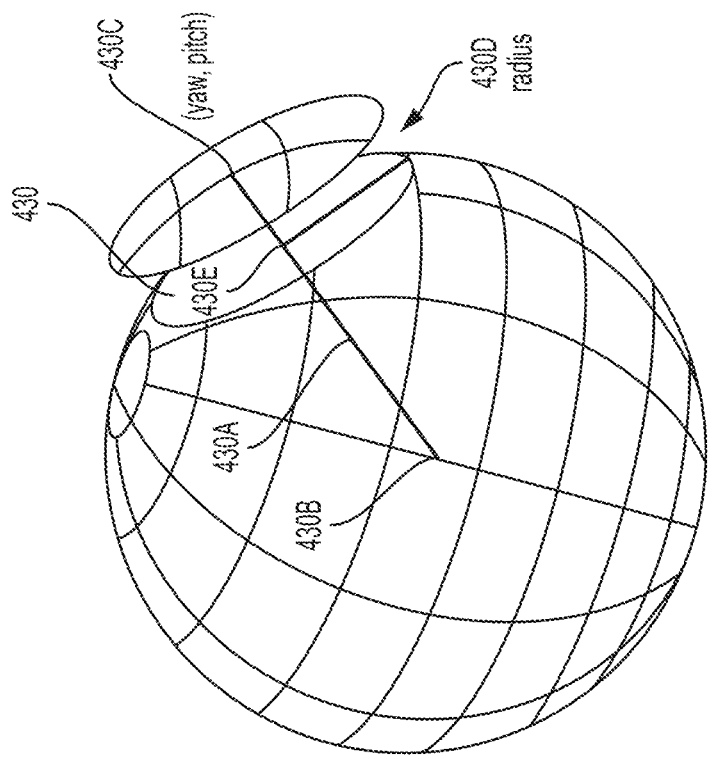
FIG. 4C shows a circular ROI, according to some embodiments.

FIG. 4C shows a circular ROI 430, according to some embodiments. The circular ROI 430 is a circle defined by a plane (not shown) perpendicular to a ray 430A from the sphere center 430B to the viewpoint 430C at (yaw, pitch), whose points all have the distance radius 430D on the plane from the intersection point 430E of the ray 430A and the plane. In some embodiments, when the radius 430D is equal to zero, then the ROI 430 becomes a single viewpoint at (yaw, pitch). In some embodiments, the circular ROI 430 can be signaled by yaw, pitch, and radius.

A polygon can be used to describe an ROI. A polygon can be expressed as a list of points on the sphere. The list of points can be linked together in a particular fashion, such as linking them together clockwise or counter-clockwise. FIG. 4D shows an ROI 440 represented by a polygon, according to some embodiments. The polygon ROI 440 is formed with boundaries 440A defined by great circles connecting any two adjacent viewpoints around the region containing the ROI_center 440F. The polygon ROI 440 can be signaled by (yaw, pitch, yaw_1, pitch_1, . . . yaw_n, pitch_n), where n is the number of points of the polygon. For example, when n=3, there are three points, which defines an ROI of a triangular shape. As another example, when n=4, there are four points, which defines a rectangle.

Figure 4E:
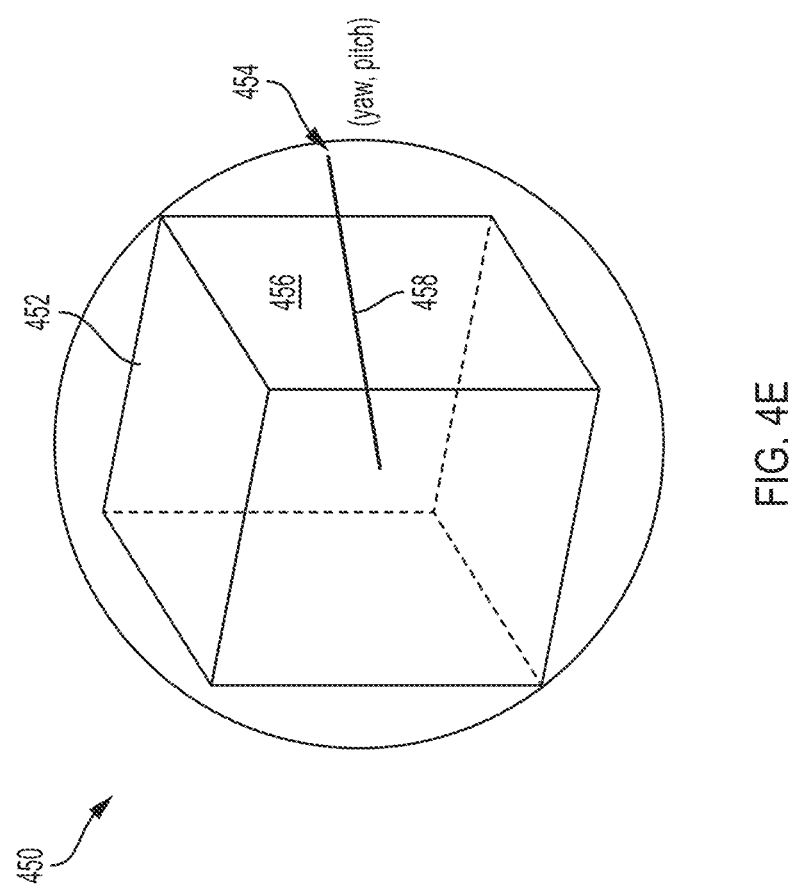
FIG. 4E shows an ROI represented by a face of a three-dimensional shape, according to some embodiments.

FIG. 4E shows an ROI 450 represented by a face of a three-dimensional shape 452, according to some embodiments. The face-based ROI 450 is the face of the 3D geometry shape 452 (in this example, a box) that contains the viewpoint 454 at (yaw, pitch), shown as face 456. In some embodiments, the ROI 450 is the face of the 3D geometry shape 452 that intersects with the ray 458 from the sphere center to the viewpoint 454. While exemplary FIG. 4E shows a box as the three-dimensional shape, other three dimensional shapes can be used, such as pyramids and more complex multi-sided shapes. The face-based ROI 450 can be signaled by (yaw, pitch).

As discussed further below, if multiple ROIs are supported, each ROI can be associated with an index number or a shape number. For example, if two ROIs are supported, those two ROIs can be supported with index numbers 1 and 2 to identify the type of ROI, as discussed further below. As another example, each of the ROIs shown in FIGS. 4A-4E can be represented using index numbers or shape numbers 1-5.

An ROI can be specified using a sample entry, a sample format, or both. An ROI specification can be associated with the video (e.g., metadata describing the ROI). For example, the ROI specification can be carried in a timed metadata track of the ISO Base Media File Format, as well as within a video track. The ISO Base Media File Format is defined in w16191, referred to above and incorporated by reference herein in its entirety.

FIG. 5A shows an exemplary 3D spherical coordinates sample entry (3dsc) 500, according to some embodiments. The 3D spherical coordinates sample entry 500 provides spatial information related to the referenced track(s) expressed in a three-dimensional spherical coordinates (yaw, pitch, roll). The sample entry is of the type '3dsc,' the container is a 'stsd' sample description box, the entry is not mandatory, and the quantity can be either 0 or 1.

FIG. 5B shows a 3D spherical coordinate system sample entry class 510, according to some embodiments. The sample entry class is the 3DSphericalCorrdinateSampleEntry, which extends the MetadataSampleEntry '3dsc' discussed in FIG. 5A. The sample entry includes three sixteen bit unsigned integers reference_yaw, reference_pitch, and reference_roll. The entries for reference_pitch, reference_yaw and reference_roll can give respectively the reference (or offset) values of the pitch, yaw and roll angles in the reference system in which the pitch, yaw and roll angles of spherical points are computed. In some embodiments, the maximum ranges of reference_yaw, reference_pitch, and reference_roll can be, respectively, [0, 180], [0, 360] and [0, 360], representing the maximum angle ranges [−90, 90], [−180, 180], [−180, 180] for pitch, yaw and roll. In some embodiments, the maximum value ranges can also be chosen to represent the maximum angle ranges [−90, 90], [0, 360], [0, 360] for pitch, yaw and roll. In some embodiments, the values of these three entries can be set to 0, e.g., if the north and south poles are fixed in the standard manner and no additional roll is introduced.

FIG. 5C shows an example of an ROI syntax 520, according to some embodiments. This syntax 520 is for exemplary purposes only. Different syntaxes may be used, e.g., depending on a type of ROI (e.g., as discussed above), as well as a type of viewport, and/or the like. The example ROI syntax 520 in FIG. 5C is a class ROIDefinitionSample.

The "source_id" is an 8 bit unsigned integer that can provide a unique identifier for the source of the spherical content. In some embodiments, ROIs sharing the same source_id value can share the same spherical coordinates.

The "roi_id" is an 8 bit unsigned integer that can provide a unique identifier for the ROI with respect to the spherical content identified with source_id. The "roi_type" is an 8 bit unsigned integer that can provide a code for an ROI type. As discussed above, different ROI shapes can be distinguished among using an index or shape number. For example, FIG. 5D is a table 530 that shows a type 532, a description of the shape boundaries on the sphere 534, and associated signaling 536, according to some embodiments. For example, a type of one (1) can represent a circular ROI, four type values (2-5) can be used to represent four rectangular ROIs, one type value (6) can be used to represent the polygon types, and one type value (7) can be used to represent a 3D geometry ROI.

The "yaw" and "pitch" are 16 bit unsigned integers that can provide, respectively, the values of the yaw and pitch angles of a point or viewpoint on the sphere. In some embodiments, it is this point that the ROI contains.

The "radius" is a 16 bit unsigned integer that can indicate the radius of a circular ROI (e.g., with roi_type equal to 1 as shown in FIG. 5D).

The "yaw_width" and "pitch_height" are 16 bit unsigned integers that can give, respectively, the width and height values in terms of the yaw and pitch angles for each of the four rectangular ROI types on the sphere. For example, these fields can be used for ROIs with a "roi_type" equal to 2, 3, 4 and 5 shown in FIG. 5D.

The "num_vertices" is a 16 bit unsigned integer that can indicate the number of vertices of a polygon ROI (e.g., with roi_type equal to 6 in FIG. 5D). In some embodiments, this value is typically greater or equal to 3. For each vertex of the polygon, "vertex_yaw" and "vertex_pitch" are 16 bit unsigned integers that can define the associated vertex's yaw and pitch values.

The "purpose" is an 8 bit unsigned integer that can give a code value for the purpose of the ROI definition. The purpose can include, for example, reserved (value of 0), rendering (value of 1), annotation (value of 2), pre-fetching (value of 3), and/or the like.

The "quality" is an 8 bit unsigned integer that can give a code value for the content quality of the ROI. For example, the "quality" value can be in the scale of 0 to 255, with 0 being the lowest and 255 the highest.

The "ranking" is an 8 bit unsigned integer that can give a code value for the content ranking of the ROI. For example, the "quality" value can be in the scale of 0 to 255, with 0 being the lowest and 255 the highest.

The "interpolate" is a one bit unsigned integer (e.g., used to represent a true or false value) that can indicate the continuity in time of the successive samples. For example, when true, the application may linearly interpolate values of the corresponding ROI metadata attributes between the previous sample and the current sample. When false, there shall not be any interpolation of values between the previous and the current samples. In some embodiments, when using interpolation, the interpolated samples may match the presentation time of the samples in the referenced track. For example, for each video sample of a video track, one interpolated ROI definition sample is calculated.

As noted above, only a subset of these exemplary fields may be used for a particular ROI. For example, the syntax may omit some fields and/or may not populate some fields (e.g., or populate such fields with a null value) depending on the type of ROI or viewport. For example, for a circular ROI, then the "yaw" and "pitch" fields can be used to specify a direction, and the "radius" field can be used to specify the radius. As another example, for a rectangular ROI, then the "yaw_width" and "pitch_height" fields can be used to specify dimensions of the rectangular ROI.

Encoders and decoders can be configured to process such ROI/viewport information. For example, an encoder can be configured to store metadata that describes an ROI, such as using a spherical region structure that specifies the ROI. The metadata can include a center point of the ROI on the sphere, as well as additional data. For example, the metadata can include data indicative of a set of side points, such as a side point for each side of the region of interest on the sphere (e.g., the left, right, top and bottom center side points). For example, the metadata can include a horizontal range and a vertical range, which can be computed based on an associated set of side points (e.g., the left and right side points for the horizontal range) and the center point of the ROI on the sphere. As discussed herein, the metadata can describe a circular ROI, a rectangular ROI, a polygonal ROI, an ROI based on a 3D shape, and/or the like.

As another example, a decoder can receive video data that includes a region of interest, and identify a spherical region structure (e.g., metadata) associated with the video data that specifies the region of interest on a sphere. The spherical region structure can specify data sufficient to describe the ROI, as discussed herein (e.g., an ROI in the 3D data). The decoder can determine the region of interest in the video data based on the spherical region structure.

The techniques described herein provide techniques for associating an ROI with its base content (e.g., the content that the ROI is part of). The association can be made implicitly or explicitly. For example, in a single file, there could be multiple video tracks carrying multiple pieces of spherical content or their projected versions. Therefore, there is a need to indicate or signal which track(s) have the content related to only one spherical surface. An implicit association may depend on where ROI information is placed. For example, if the ROI information is placed within a video track that has the content, then it can naturally imply that the ROI is part of the content. For example, an ROI can be associated with the content of a video track where the signaling of the ROI information is part of. In some embodiments, in the file format, if an ROI is signaled in a timed metadata track and the file contains only a single piece of content with one or more video tracks (possibly with different qualities), then the ROI is associated with the media content in the file implicitly.

In some embodiments, if an ROI is signaled in a video track as its metadata, then it is associated with the video content of the track. For example, in the MPEG DASH, if an ROI is signaled in a metadata representation of a Media Presentation Description (MPD), and the MPD contains only one media component of media type video, then it is associated with the content of the video component in the MPD. As another example, if an ROI is signaled as a metadata element or a metadata attribute of a video representation, then it is implicitly associating with the content of the containing video representation.

In some embodiments, the association of the ROI to the content can be done more explicitly. In particular, often times the video content is the video content, so the ROI really depends on who is looking at the content and who considers what areas are of interest. A flexible way to make an association can be to take the ROI out of video content. For example, two viewers (e.g., editors or end users) may be viewing the same content, but each viewer is interested in viewing entirely different areas of the content. So each viewer could define ROI (or viewport) information for the video content, and then point to the video to indicate that that the video has two ROIs (e.g., an ROI for each viewer).

In some embodiments, the ROI can be associated explicitly for visual (e.g., 3D) spherical content and/or to a projected and mapped (e.g., 2D) frame. For a 2D association, for example, the ROI can be mapped to the 2D content, then the 2D content can be mapped to spherical content, such that the ROI association is done at the 2D level. For a 3D association, for example the 3D spherical content can have a viewport/ROI info specified in a timed metadata track. For example, the grouping and association mechanisms of tracks in the File Format and adaptationSets and representations in the MPEG DASH can be used to explicitly make an association. For example, in the file format, if an ROI is signaled in a timed metadata track, then it can be associated with a video track or video tracks through the Track Reference Box in the metadata track to link it to the video track or tracks. As another example, an ROI can be associated using the track group box mechanism of the metadata and video tracks to group video tracks together to indicate that the video tracks are associated together as a group of media tracks of a same source. As a further example, in the MPEG DASH, if an ROI is signaled in a metadata representation and a video representation is associated with the metadata representation using the @associationId and @associationType attributes, then the ROI can be associated with the video content of the video representation.

In some embodiments, an ROI can be associated with a track of 2D video frames that results from projecting, mapping and/or partitioning a source of 3D spherical content. The track can contain content that can be used to reconstruct the 3D ROI. In some embodiments, a single track of 2D video frames can be associated with zero or more ROIs, e.g., to indicate that the track contributes to those zero or more ROIs.

The ROI syntax and association techniques can be used for various use cases. FIG. 6 shows a table 600 of exemplary ROI use cases, according to some embodiments. Table 600 shows each use case 602, the purpose of the ROI signaling for the use case 604, and the support 606 for the use case. As shown in table 600, the use cases can include content prefetching 610, most viewed regions 612, director view from an artistic intent 614, initial viewport for on-demand content 616, random access viewport 618, available views for non-VR devices 620, background texture 622, close-up view (video-to-video) 624, annotating 626, quality ranking 628, and 3D face-based ROIs 630.

As discussed, ROI and viewport information can be signaled within either timed metadata tracks or video track metadata, e.g., similar to the carriage of spatial information for 2D videos. However, in some situations it may be undesirable (and/or not feasible) to associate timed metadata tracks or video track metadata with media tracks that the ROI and viewport metadata information is associated with (e.g., what metadata is associated, and with which media tracks the metadata is associated). For example, if the content is projected to a 2D plane and then divided into tiles/sub-pictures, then each will be carried in a single video track. However, if it is desired to specify the VR content, while the spherical content has an ROI or a viewport, techniques are needed to associate the ROI or viewport to all of the associated tiles/sub-pictures. As a general example, one way to associate the viewport with the tiles/sub-pictures is to define the ROI in a metadata track, and then capture the ROI information (e.g., the rectangle shape) in a metadata track. However, this may not be consistent with existing video coding techniques because if the metadata track is associated to a video track, then the video track itself has ROIs specified by the metadata track. For example, if there is a collection of sub-picture tracks, it is undesirable to indicate that each one has the ROI, because it is the spherical surface that has the ROI.

Figure 7:
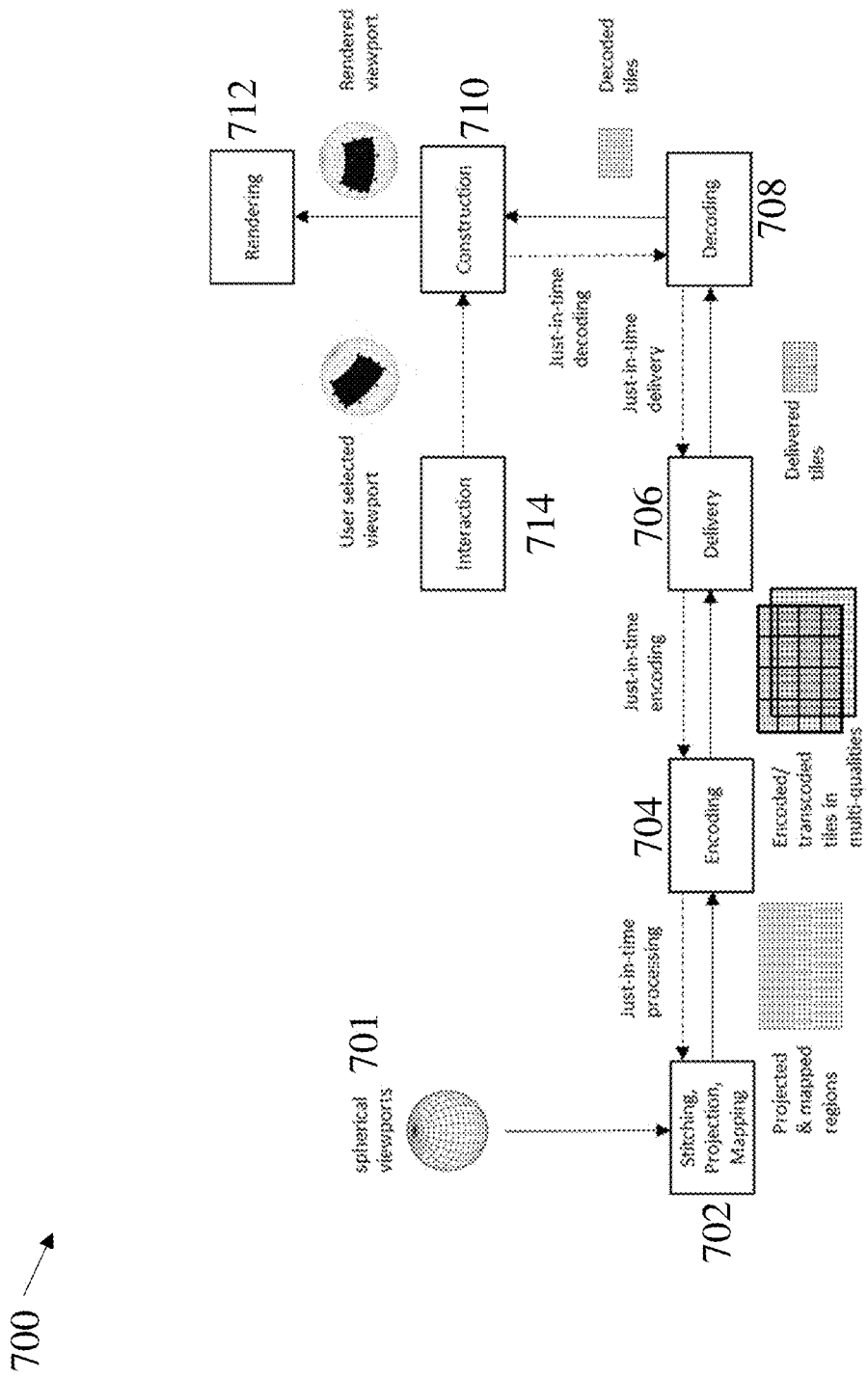
FIG. 7 a viewport dependent content flow process for VR content, according to some examples.

FIG. 7 shows a viewport dependent content flow process 700 for VR content, according to some examples. As shown, spherical viewports 701 (e.g., which could include the entire sphere) undergo stitching, projection, mapping at block 702 (to generate projected and mapped regions), are encoded at block 704 (to generate encoded/transcoded tiles in multiple qualities), are delivered at block 706 (as tiles), are decoded at block 708 (to generate decoded tiles), are constructed at block 710 (to construct a spherical rendered viewport), and are rendered at block 712. User interaction at block 714 can select a viewport, which initiates a number of "just-in-time" process steps as shown via the dotted arrows.

In the process 700, due to current network bandwidth limitations and various adaptation requirements (e.g., on different qualities, codecs and protection schemes), the 3D spherical VR content is first processed (stitched, projected and mapped) onto a 2D plane (by block 702) and then encapsulated in a number of tile-based (or sub-picture-based) and segmented files (at block 704) for playback and delivery. In such a tile-based and segmented file, a spatial tile in the 2D plane (e.g., which represents a spatial portion, usually in a rectangular shape of the 2D plane content) is typically encapsulated as a collection of its variants (e.g., such as in different qualities and bitrates, or in different codecs and protection schemes (e.g., different encryption algorithms and modes)). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 706), and then decoded (at block 708) to construct and render the desired viewport (at blocks 710 and 712).

To avoid redundancy in coding the same content, there are typically not different sized tiles (e.g., larger or smaller tiles) that represent the same content of other tiles. Thus, when tile variants are encapsulated in individual tracks separately, there is typically no hierarchical structure in tile variant containment, which can lead to a lack of hierarchical structure of track containment within a file and/or across different files. Therefore, there are typically no single tracks with which properties and metadata for collections of tiles, e.g., all tiles for the spherical content, can be associated. It can therefore be difficult and/or infeasible to specify metadata for the collection of tiles and tracks.

ISOBMFF includes some grouping mechanisms for tracks (e.g., which can be used to group tiles). For example, boxes such as the Track Group Box 'trgr' and the Track Selection Box 'tsel', can be used to label tracks and to signal them as a group of tracks and an alternate group of tracks, respectively. By using such boxes, individual tracks with a same group identifier and group type belong to a same group. However, such track grouping mechanisms, through labeling individual tracks, can present a number of issues when used in the context of the generic viewport dependent content flow process. These issues can result from, for example, the fact that there is no a single "tile" track that represents content of the variant tracks of a tile, the fact that there is no single track that represents content of the entire spherical VR content which is a composition of all individual "tile" tracks, and/or the like. The issues can include, for example, an inefficiency in determining how many tracks belong to a particular group, without scanning through all the tracks in the file or all the relevant files. The issues can include, for example, an infeasibility in associating any global information (e.g., such as projection and mapping information, viewports, ROIs, and other metadata) about the entire spherical VR content with any particular track, if not with each and every "variant" track. This may be caused by, for example, the fact that any metadata track (e.g., such as timed metadata of spatial information) is typically associated with a media track it describes by means of a 'cdsc' (content describes) track reference. The timed metadata of spatial information can be implemented, for example, as described in m39974, entitled "VR ROI Signaling," January 2017, Geneva CH, which is hereby incorporated by reference herein in its entirety. Associating each metadata track with each and every media "variant" track can be cumbersome and tedious, e.g., especially if the multiplication of the number of tiles and the number of variants of each tile gets relatively large. The issues can also include a difficulty in supporting construction of new tracks from a group of existing tracks, in order to supporting, for example, the just-in-time viewport construction to cover some target ROIs.

In some embodiments, the viewport or ROI can be signaled using a composite track. Therefore, composite media tracks can be derived, and timed metadata tracks and video track metadata can be associated with their corresponding composite tracks. For example, a viewport/ROI can be explicitly signaled for 3D spherical content, e.g., via an association of a viewport/ROI timed metadata track and the 3D content derived via composite tracks. Using a composite track provides a single track that can be used to represent the content of the variant tracks of a tile. Additionally, using composite tracks can avoid the need to associate each metadata track with each and every media variant track. Further, using a composite track can allow global information to be associated with just the composite track, and can avoid an encoder/decoder from needing determine how many tracks belong to a particular group. As a further example, using composite tracks can help build a track hierarchy to indicate how tracks are related in terms of composite relationship, e.g., when the composite tracks are derived from variant tracks and (composite) tile tracks.

A derived track can be identified by the track containing sample entry of the type 'dtrk.' A derived sample can contain an ordered list of the operations to be performed sequentially on an ordered list of corresponding images or samples from an ordered list of input tracks. Each of the operations can be specified or indicated by the TransformProperty. For example, a list of TransformProperty operations can include identity ('idtt'); clean aperture ('clap'); rotation ('srot'); dissolve ('dslv'); crop ('2dcc'); and/or the like.

In order to support VR viewport dependent content flow processes, additional TransformProperty items can be used to derive composite tracks from existing tracks. Various types of composite tracks can be generated, such as a composite of all video tracks ('cmpa'), a composite of only one track ('cmp1,' which can allow switching at the sample and sample group levels), a composite of any track ('cmpn,' which can allow switching at the sample and sample group levels), a selection of only one track ('sel1,' which can be a track level selection, and may not include switching at the sample level), a selection of any track ('seln,' which can be track level selection, and may not include switching at the sample level), a scaling ('scal'), a resize ('resz'), and/or the like.

For example, the 'cmpa' transform property can specify a reference width and height of a derived sample, and can place (e.g., composes) each input image onto the derived sample at its corresponding specified x,y location and specified size. The 'cmp1' transform property can specify a reference width and height of a derived sample, and can place one, anyone and only one of the input images onto the derived sample at its corresponding location and corresponding size. The 'cmpn' transform property can specify a reference width and height of a derived sample, and can place one or more of the input images onto the derived sample at their corresponding location and with their corresponding size. The 'sel1' transform property can specify a reference width and height of a derived sample, and can place one or more of the input images onto the derived sample at their corresponding location and corresponding size. The 'sel1' transform property can be like selecting one track from a list of input tracks. The 'seln' transform property can specify a reference width and height of a derived sample, and can place one or more input images from a same subset of input tracks selected throughout the entire transformation onto the derived sample at their corresponding location and with their corresponding size. The 'seln' transform property can be like selecting n (n>0) tracks from a list of input tracks.

Essentially, the 'cmpa,' 'cmp1,' 'cmpn,' 'sel1,' and 'seln' operations specify a number of '2dcc' like fields that provide 2D spatial information for composing input 2D image samples onto a derived 2D image sample, according to their respective definition and semantics. According to some embodiments, with these additional TransformProperty items, a "tile" track can be specified as a derived, composite track of its "variant" tracks using 'cmp1' or 'sel1." A track of the entire VR spherical content, when projected onto a 2D plane, can be specified as a derived, composite track of its "tile" tracks using 'cmpa.' A viewport or ROI track can be specified as a derived, composite track of its "tile" tracks using 'cmpn' or 'seln.' The techniques described in m33971, entitled "Deriving Composite Tracks in ISOBMFF," dated January, 2017, which is hereby incorporated by reference herein in its entirety, provide techniques for mapping the 2D composite track back to spherical 3D content.

The techniques described herein provide techniques for deriving VR viewport or ROI tracks as composite tracks. According to some embodiments, a VR (projected and mapped) viewport or ROI track can be defined from the tile tracks. For example, the viewport or ROI track can be defined using the transform properties 'cmpn' or 'seln.' As another example, a number of viewport or ROI tracks can be defined (e.g., according to certain variant characteristics) from tile variant tracks using 'cmpa,' which can then be composited together by selecting one of them using 'sel1.' A timed metadata track or video track metadata for a VR viewport or ROI can be defined. The metadata track or metadata can then be associated with a such-defined composite VR viewport or ROI content track, e.g., by means of a 'cdsc' (content describes) track reference, and/or by placing the metadata inside the content track.

Figure 8A:
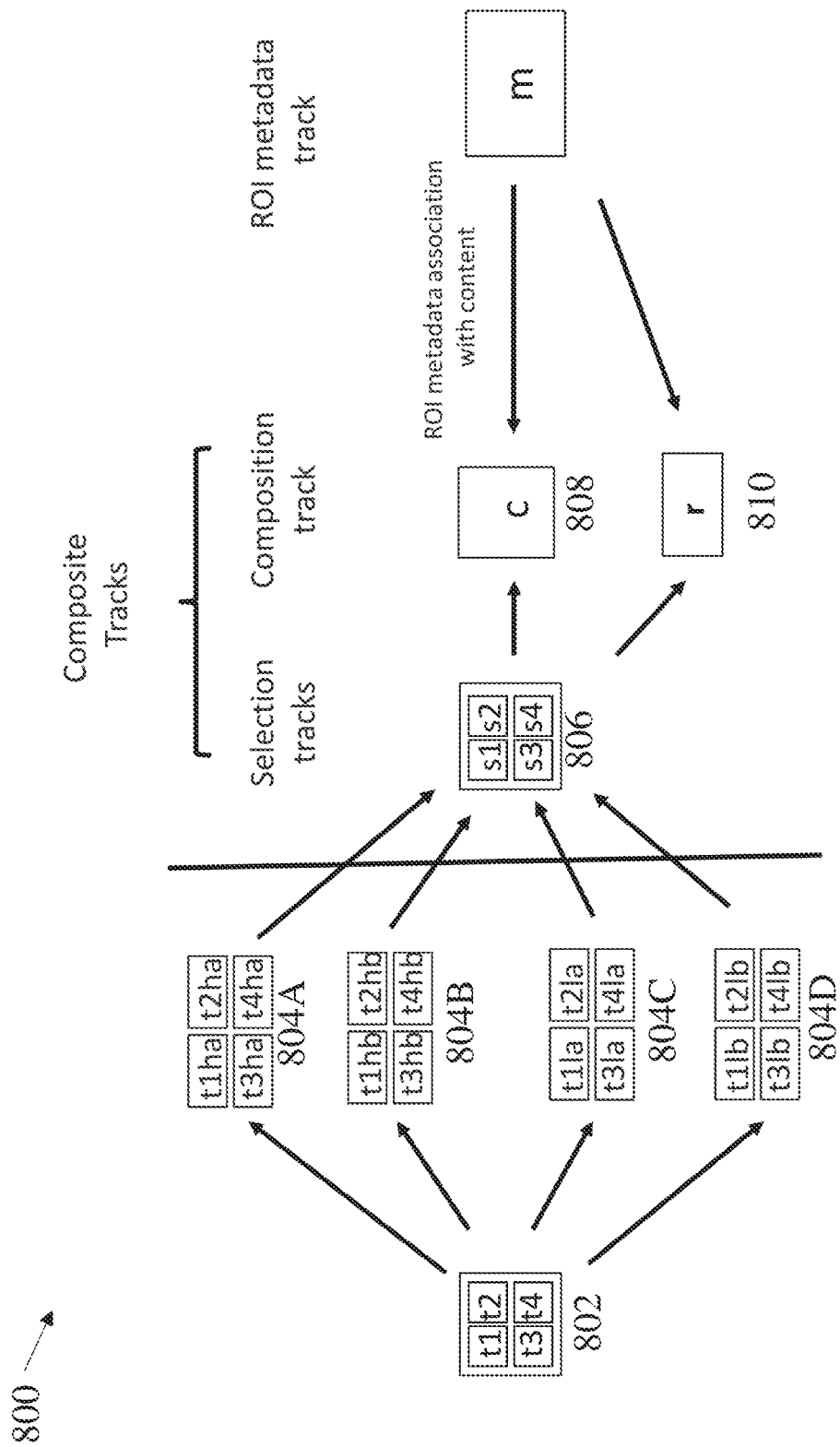
FIG. 8A shows an exemplary diagram of using a composite track to signal a viewport/ROI, according to some embodiments.
Figure 8B:
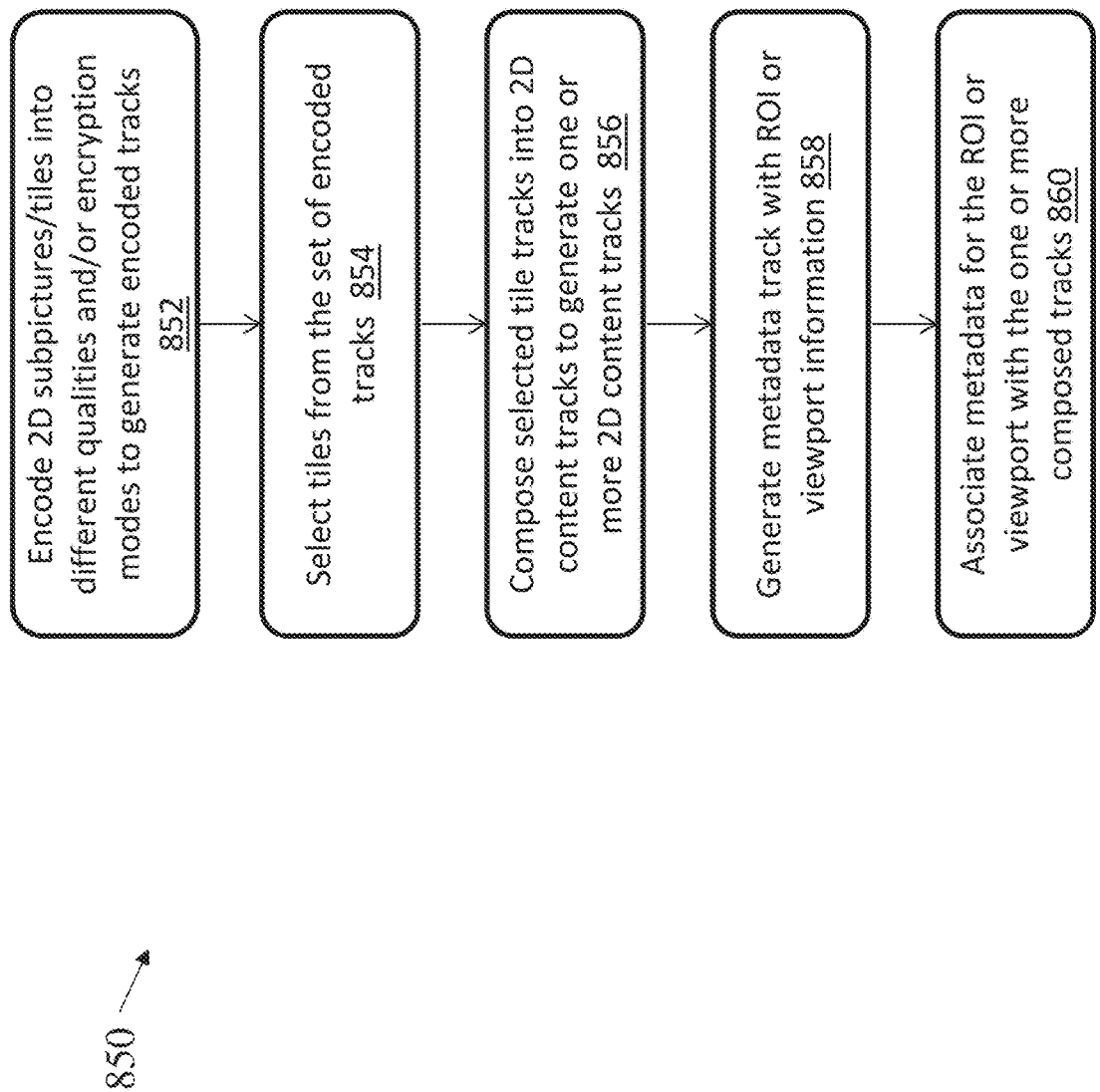
FIG. 8B shows an exemplary process for signaling a viewport/ROI using a composite track, according to some embodiments.

FIG. 8A shows an exemplary diagram 800 of using a composite track to signal a viewport/ROI, according to some embodiments. FIG. 8B shows an exemplary process 850 for signaling a viewport/ROI using a composite track, according to some embodiments. At step 852, the encoder encodes 2D subpictures/tiles into one or more different qualities and/or one or more different encryption modes. For example, referring to the diagram 800, at step 852 four 2D subpicture (or tile) tracks t1-t4 (802) are encoded for two different qualities (e.g., 'h' for HD and 's' for SD) and two different encryption modes (e.g., the Common Encryption Scheme (CENC) with encryption modes 'a' for CTR and 'b' for CBC). The encoding and encryption generates four different groups of four tracks 804A-D (referred to as encoded tracks 804, generally), for a total of sixteen tracks. Encoded tiles 804A correspond to a high quality ('h') encoded using a first encryption mode ('a') (thus, 'ha'). Encoded tiles 804B correspond to a high quality ('h') encoded using a second encryption mode ('b') (thus, 'hb'). Encoded tiles 804C correspond to low quality ('l') encoded using a first encryption mode ('a') (thus, 'la'). Encoded tiles 804D correspond to a low quality ('l') encoded using a second encryption mode ('b') (thus, 'lb').

The composite track is generated based on the encoded tracks 804. At step 854, tiles are selected from the encoded tracks 804. The tiles can be selected based on one or more transform properties (e.g., in a list of TransformProperties, as discussed above). Referring to FIG. 8A, for example, four tiles s1-s4 are selected, according to the operations shown below for this example:

s1=sel1{cmp1{t1ha, t1la}, cmp1{t1hb, t1lb}}
s2=sel1{cmp1{t2ha, t2la}, cmp1{t2hb, t2lb}}
s3=sel1{cmp1{t3ha, t3la}, cmp1{t3hb, t3lb}}
s4=sel1{cmp1{t4ha, t4la}, cmp1{t4hb, t4lb}}

Referring to the exemplary operations above, composition (cmp1) and selection (sel1) are used because the composite track is coming from a number of different tracks encoded using different qualities and encryption modes. Quality variants are composed first using 'cmp1' and then encryption variants are composed using 'sel1.' For example, assume an m×n grid of subpicture tracks, where each subpicture has q different qualities and is encrypted in 2 modes, then there are m×n×q×2 tracks. But when adaptively streaming the content, only the quality for underlying connection bandwidth is dynamically selected, whereas the encryption mode is statically selected. Therefore, 'cmp1' is used to select the appropriate quality tile at the sample or sample group level, and 'sel1' is used to select the appropriate encrypted tile at the track level, as discussed above.

Referring further to FIG. 8B, at step 856, the selected tile tracks are composed into 2D content tracks to generate one or more 2D content tracks. For example, referring to FIG. 8A, a composition is performed on the selected tracks 806 to composite the subpictures into 2D content tracks. The composition process generates a composition track C 808 and composition track r 810. The composition track C 808 can include data from all of the selected tracks 806, whereas the composition track r 810 can include data from a subset of the selected tracks 806. The composition track C can be generated using, for example, cmpa{s1, s2, s3, s4}, which composites all the tiles. In some embodiments, if an ROI or viewport involves or is covered by any of the tiles t1, t2, t3 and t4, an ROI or viewport track can be determined using 'cmpn' (e.g., and/or possibly other transform properties if crop, resize or rotation are involved). For example, the ROI or viewport composition track r 810 can be determined using cmpn{s1, s2, s3, s4}. In some embodiments, if an ROI or viewport involves or is covered by only tiles t1 and t2, an ROI or viewport track can be determined using 'cmpa' (e.g., and/or possibly other transform properties if crop, resize or rotation are involved). For example, the composition track r 810 can be generated as cmpa{s1, s2}.

Referring further to FIG. 8B, at step 858, the encoder generates a metadata track with the ROI or viewport information. At step 860, the encoder associates the metadata for the ROI or viewport with the one or more composed tracks. For example, referring to FIG. 8A, the encoder can specify a timed metadata track for the ROI (or viewport) information in a timed metadata track m 812. The encoder can use the timed metadata track m 812 to associate an ROI track to either the composition track C 808 or r 810, such as by means of a 'cdsc' (content describes) track reference.

When VR content is delivered using MPEG DASH, many of the use cases shown in table 600 in FIG. 6 often require signaling viewports and ROIs within an MPD for the VR content. This can help the decoder/client to decide which, if any, viewports and ROIs to deliver and render. In order to signal a viewport or ROI in DASH, the techniques described herein associate a metadata representation with a media representation of a composite (fragmented) track in file format, and the media representation has dependency on the representations corresponding to the variant tracks that the composite track is derived from.

Different techniques can be used to carry ROI (e.g., or in general spatial) information in ISOBMF. One example is to treat the information as timed metadata of their associated media tracks, and to carry the ROI information in timed metadata tracks. Another example is to treat the information as sample descriptions of their associated media tracks, and to carry the ROI information within the media tracks.

Figure 2A:
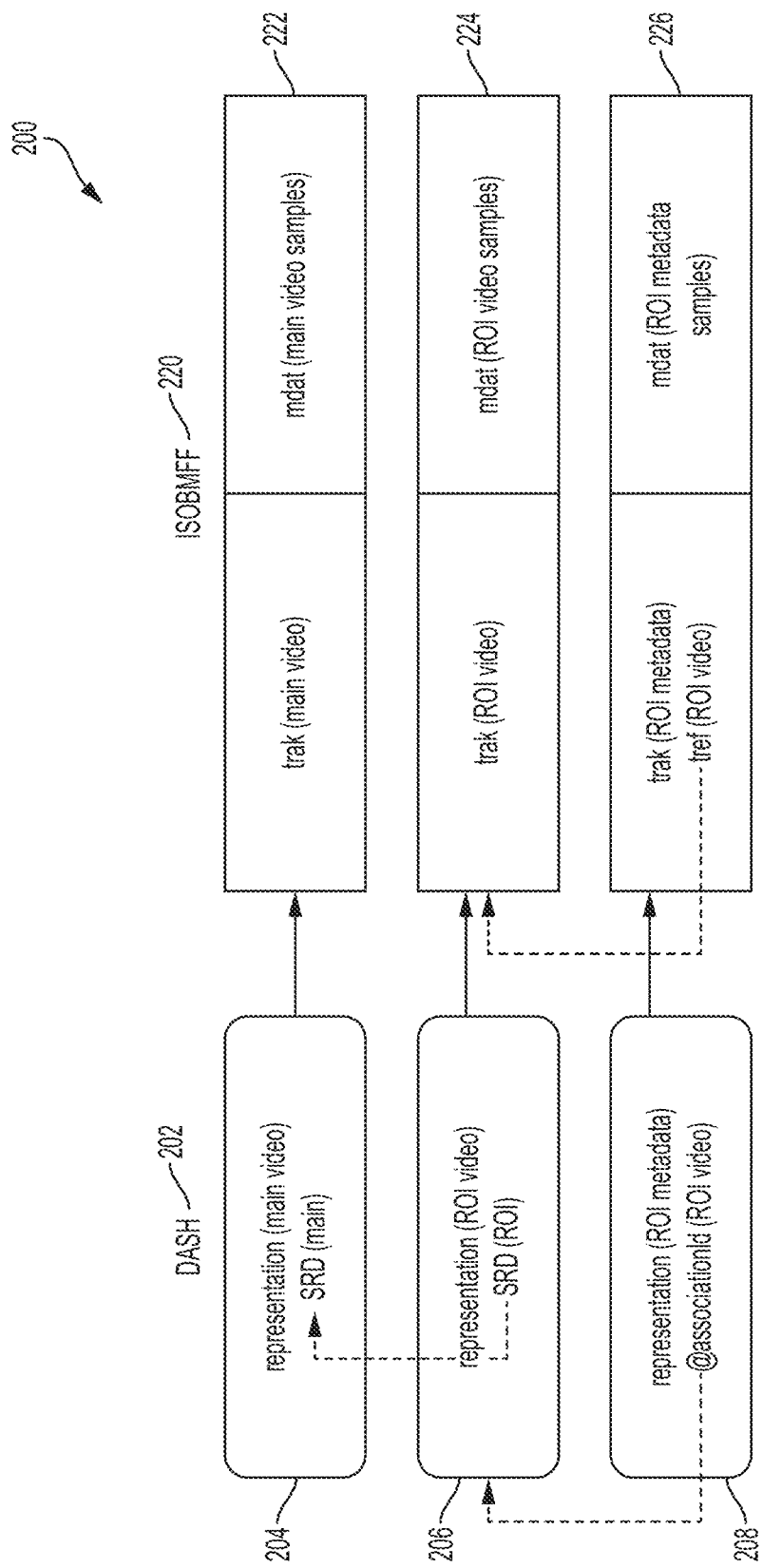
FIG. 2A shows a diagram of signaling that a main video has an ROI video using timed metadata, according to some examples.

The MPEG DASH specification provides the mechanisms of SRD (spatial relationship descriptor) and representation association using @associationId to signal spatial relationships and metadata relationships among representations. FIG. 2A shows a diagram 200 of signaling that a "main video" has an "ROI video" that can provide a close-up view of an ROI using timed metadata, according to some examples. DASH 202 representation includes three representations 204, 206 and 208: a representation of the "main video" 204, a representation of the "ROI video" 206, and a representation of the "ROI metadata" 208, which is associated with the "ROI Video" representation using the @associatoinId. The ISOBMFF 220 representation includes three 'trak's, "main video" 'trak' 222, "ROI video" 'trak' 224, and "ROI metadata" 'trak' 226. Additionally, as shown each track has associated metadata. "Main video" 'trak' 222 includes metadata for the main video samples, "ROI video" 'trak' 224 includes metadata for the ROI video samples, and "ROI metadata" 'trak' 226 includes metadata for the metadata samples.

Figure 2B:
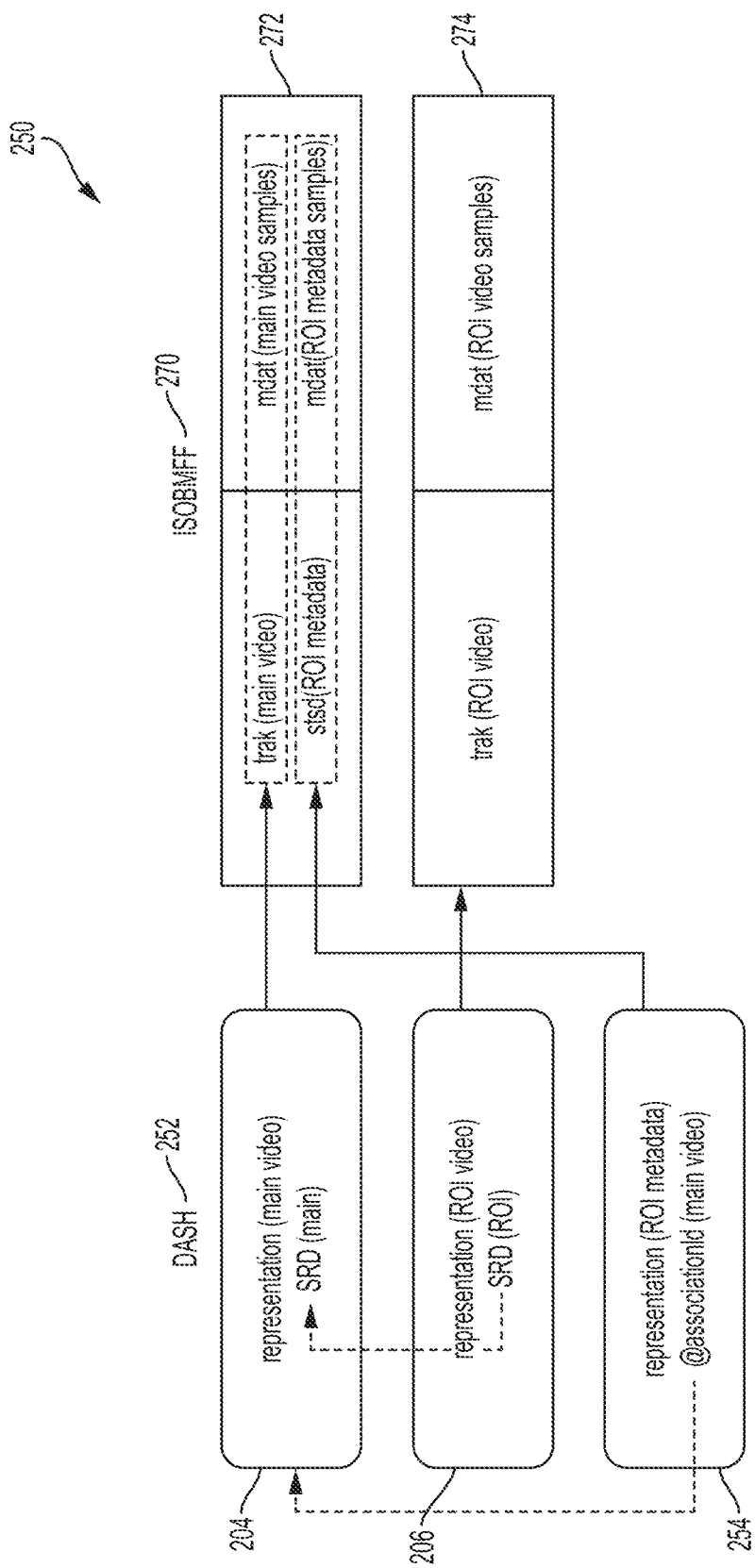
FIG. 2B shows a diagram of signaling that a main video has an ROI video using video track metadata, according to some examples.

FIG. 2B shows a diagram 250 of signaling that a "main video" has an "ROI video" that can provide a close-up view of an ROI using video track metadata, according to some examples. Compared to FIG. 2B, the DASH representation 252 includes the same first two representations 204 and 206. DASH 252 includes a different ROI metadata representation 254, which is associated with the main video (instead of the ROI video). The ISOBMFF representation only includes two 'trak's, namely "main video" 'trak' 272 and "ROI video" 'trak' 274. The "main video" 'trak' 272 includes the "ROI metadata."

Existing techniques do not provide for associating ROI and/or viewports with composite tracks. The techniques disclosed herein provide for signaling mechanisms to signal viewport and ROI information in DASH (e.g., for viewport dependent VR content process flow). As described in m33971, "variant" tracks can be composed into "tile" tracks, and "tile" tracks then into "content" tracks. This can be done using, for example, the derived track mechanism described in N16420, entitled "Technologies under Consideration for ISOBMFF," dated October, 2016. Essentially, a derived track itself does not contain any media samples, rather the derived track only specifies a list of input media tracks and a list of transform properties that define how the samples of the input media tracks should be processed to produce samples of the derived track. A composite track proposed in m39971 is a derived track that is a composite of its input media tracks according to some spatial relationship information and logical relationship (e.g., all, anyone and any). Composite tracks can be useful to specify, for example, "tile" tracks from "variant" tracks and "content" tracks from "tile" tracks.

Figure 9:
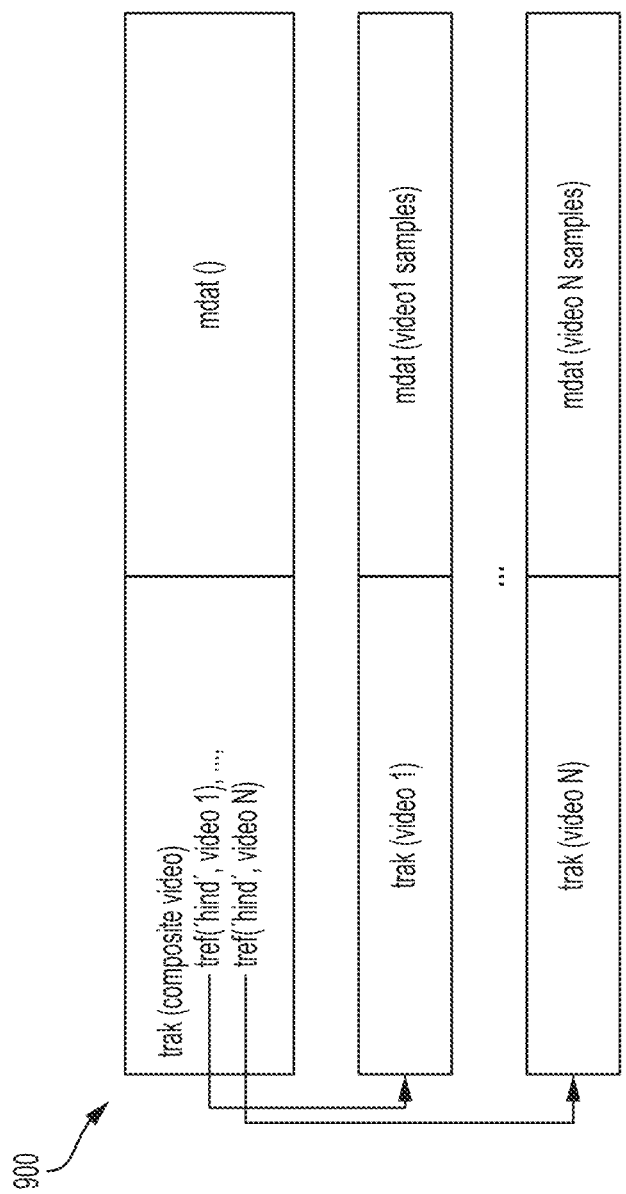
FIG. 9 shows a diagram of a composite track and its input tracks, according to some embodiments.

FIG. 9 shows a diagram 900 of a composite track and its input tracks, according to some embodiments. The "composite video" includes "N" references to video sources "video 1" through "video N." Each video source track is associated with metadata for those video samples. In some examples, when a composite track corresponds to VR spherical content (and/or a portion of the VR spherical content), the viewport and ROI information can be carried in different ways. For example, the viewport and ROI information can be carried in a timed metadata track and associated with the composite track, treated as composite track metadata and carried within the composite track, and/or the like. In some examples, the composite track can be implemented as discussed in m39973, entitled "Signaling for VR Viewports and ROIs in ISOBMFF using Composite Tracks," which is hereby incorporated by reference herein in its entirety. The composite track viewport and ROI information can be implemented as discussed in m39629, entitled "ROI Signaling for VR Content," January, 2017, which is hereby incorporated by reference herein in its entirety.

Figure 10:
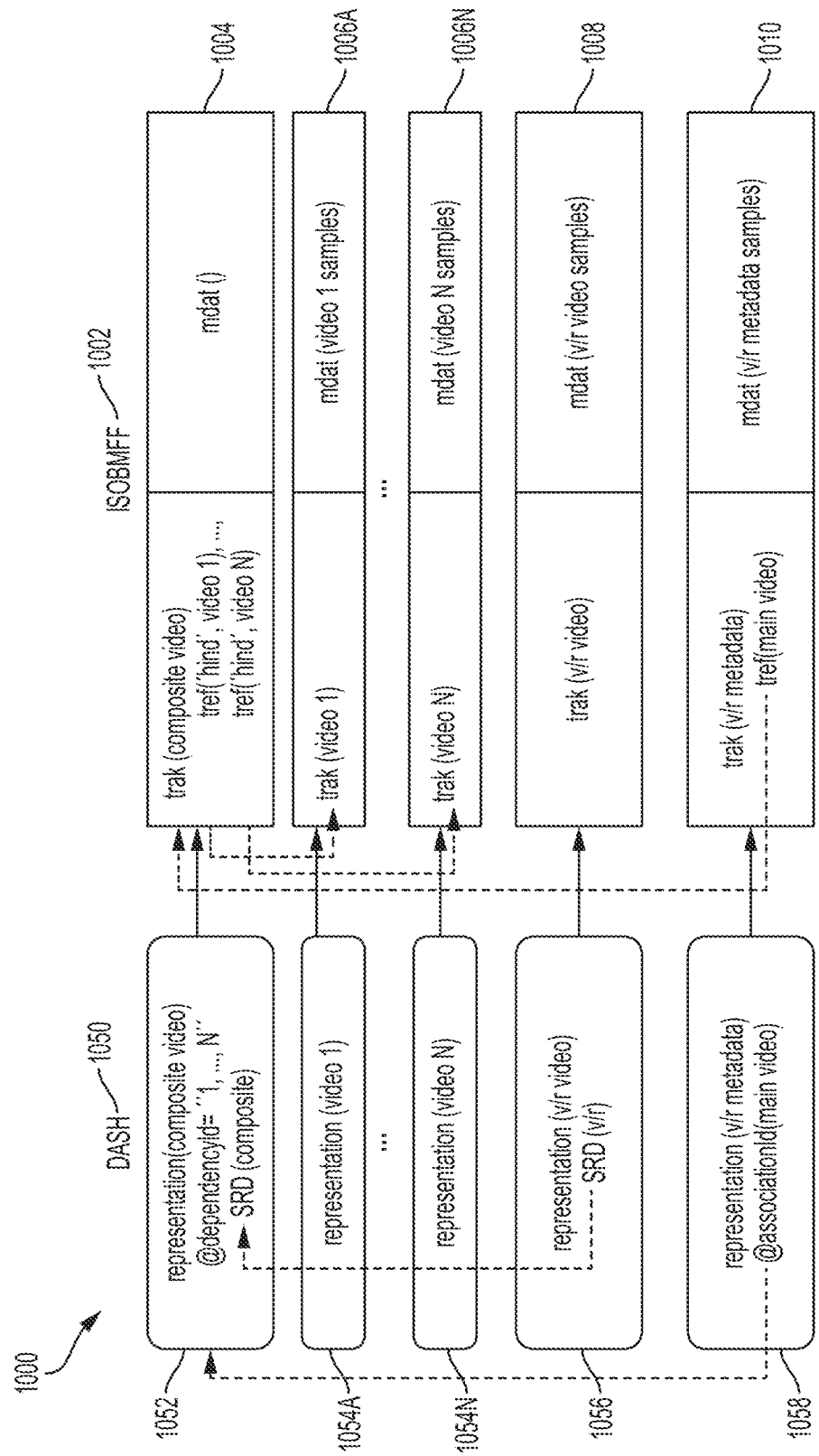
FIG. 10 shows a diagram of signaling viewports and ROIs using timed metadata tracks, according to some embodiments.

FIG. 10 shows a diagram 1000 of signaling viewports and ROIs using timed metadata tracks, according to some embodiments. Referring to the ISOBMFF portion 1002, the "composite video" is shown in the top 'trak' 1004, which is constructed from "video 1" through "video N" tracks. As shown by 'trak' 1004 including mdat ( ), the "composite video" track does not have content since it does not store any samples. The actual video is in 'trak's 1006A (for "video 1") through 1006N (for "video N"). For example, to play a track, the actual content comes from 'trak's 1006A-N. At 'trak' 1008, "v/r video" is the viewport/ROI video. 'trak' 1010 is the metadata track, which includes a reference ('trf') back to the main "composite video" track in 'trak' 1004. Therefore, as shown in diagram 1000, when the metadata in 'trak' 1010 carries ROI and/or viewpoint data, then the ROI and/or viewpoint data is linked back to the composite video.

Referring to the DASH portion 1050, DASH has a different representation corresponding to all of the tracks. Representation 1052 corresponds to the "composite video," which has dependencies (indicated using @dependencyId) to video representations 1 through N. Representation 1054A through 1054N corresponds to video 1 through video N, respectively. Representation 1056 corresponds to "v/r video," which is the viewport/ROI video. Representation 1058 includes the metadata. The metadata is associated, using the @associationID, to point to the ID of the representation of the composite video representation (which is representation 0, the representation 1052 with the composite video).

As shown, the DASH representations are related to the ISOBMFF 'trak's. In particular, the composite DASH representation 1052 is related to 'trak' 1004; video 1 representation 1054A through video N representation 1054N are related to 'trak' 1006A through 'trak' 1006N, respectively;

v/r video representation 1056 is related to v/r 'trak' 1008; and metadata representation 1058 is related to 'trak' 1010.

Therefore, for DASH, there can be a dependency of the composite video representation 1052 on the video representations 1054A-N. This dependency provides a mechanism to support, for example, pre-fetching of viewport and ROI-related representation segments.

Figure 11:
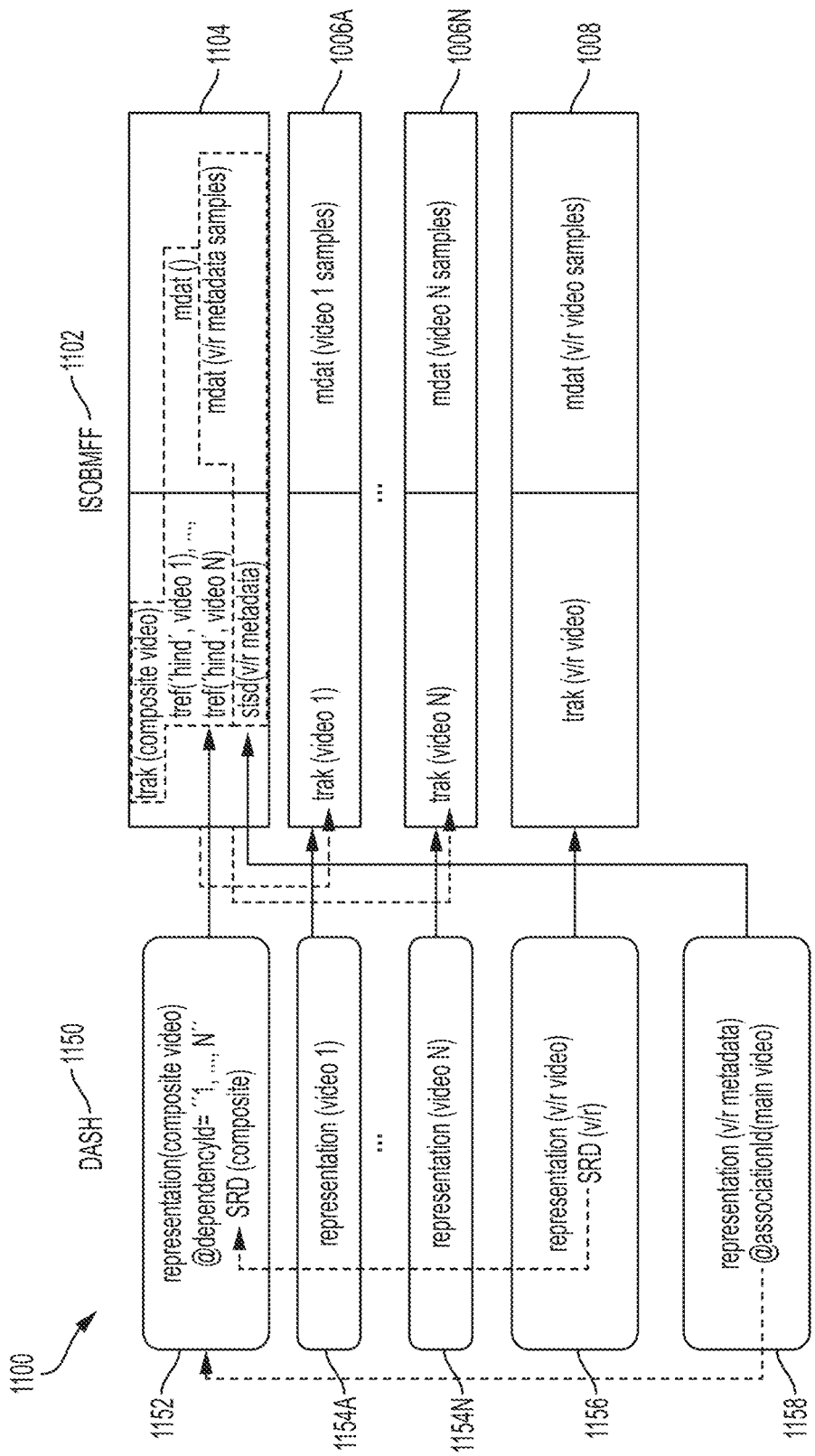
FIG. 11 shows a diagram of signaling viewports and ROIs using video track metadata, according to some embodiments.

FIG. 11 shows a diagram 1100 of signaling viewports and ROIs using video track metadata. The DASH format 1150 includes similar representations 1152, 1154A-N, 1156 and 1158 to those in FIG. 10 (representations 1052, 1054A-N, 1056 and 1058, respectively). Referring to the ISOBMFF representation 1102, tracks 1006A-N and 1008 are the same as those in FIG. 10. The first track 1104 in FIG. 11 now includes metadata since the example uses video track metadata. Therefore, there is no corresponding last track for the ISOBMFF representation 1102 like track 1010 in FIG. 10. Instead, the metadata representation 1158 is related to the first ISOBMFF track 1104. The remaining tracks 1154A-N and 1156 are related to tracks 1006A-N and 1008, similar to FIG. 10. Therefore, in DASH, when the metadata is carried in the video track, DASH still includes a separate representation 1158, whereas ISOBMFF does not include a separate metadata 'trak'. Thus, when viewport and ROI information is stored as video track metadata of a composite media track of a number of other tracks, and the information is carried within the composite track for ISOBMFF, while an additional metadata representation that corresponds to the composite track is used for DASH. The schematic diagrams shown in FIGS. 10-11 can be converted into appropriate XML expressions for MPEG DASH MPDs, in order to support the viewport and ROI related use cases.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data, the method comprising:
   receiving video data comprising a region of interest;
   identifying a spherical region structure associated with the video data that specifies the region of interest on a sphere, the spherical region structure comprising:
   a reference point of the region of interest on the sphere;
   data indicative of a set of side points, comprising a side point for each side of the region of interest on the sphere, wherein the data comprises:

a width between a first side point and a second side point from the set of side points, wherein the first and second side points are each associated with a respective different vertical boundary of the region of interest; and a height between a third side point and a fourth side point from the set of side points, wherein the third and fourth side points are each associated with a respective different horizontal boundary of the region of interest; and determining the region of interest in the video data based on the reference point and the set of side points, comprising:

determining the first side point and the second side point based on the reference point and half of the width; and determining the third side point and the fourth side point based on the reference point and half of the height.

2. The method of claim 1, wherein determining the region of interest comprises:

determining the width and the height are set to zero; and determining the region of interest corresponds to a point at the reference point.

3. The method of claim 1, wherein:

the width comprises a horizontal range and the height comprises a vertical range;

the reference point is the center point of the region of interest; and determining the region of interest comprises:

determining a left center point for a center of a left side of the region of interest and a right center point for a center of a right side of the region of interest based on the horizontal range;

determining a top center point for a center of a top side of the region of interest and a bottom center point for a center of a bottom side of the region of interest based on the vertical range;

determining the region of interest based on four great circles that extend across each of the left, right, top, and bottom center points, wherein each great circle of the four great circles is defined by an associated two-dimensional plane that passes through the center of the sphere.

4. The method of claim 1, wherein:

the width comprises a horizontal range and the height comprises a vertical range;

the reference point is the center point of the region of interest; and determining the region of interest comprises:

determining a left center point for a center of a left side of the region of interest and a right center point for a center of a right side of the region of interest based on the horizontal range;

determining a top center point for a center of a top side of the region of interest and a bottom center point for a center of a bottom side of the region of interest based on the vertical range;

determining the region of interest based on:

two great circles that extend across each of the left and right center points, wherein each great circle of the two great circles is defined by an associated two-dimensional plane that passes through the center of the sphere; and two small circles that extend across each of the top and bottom center points, wherein each small circle of the two small circles is defined by an associated two-dimensional plane that does not pass through the center of the sphere.

5. The method of claim 1, wherein:

at least a portion of the spherical region structure is signaled in a timed metadata track; and a track reference box in the timed metadata track associates the portion of the spherical region structure with the video data.

6. The method of claim 5, wherein the timed metadata track comprises data indicative of a type of the region of interest.

7. The method of claim 6, wherein the type of the region of interest comprises a ranking of the region of interest based on a number of views, an indication the region of interest is associated with a director's view, or some combination thereof.

8. The method of claim 5, wherein the timed metadata track comprises data indicative of a quality of the region of interest, a ranking of the region of interest, or some combination thereof.

9. The method of claim 1, wherein:

the received video data comprises data from a composite video track; and identifying the spherical region structure comprises identifying metadata for the spherical region structure associated with the composite video track.

10. The method of claim 9, wherein the metadata comprises a timed metadata track with metadata associated with the spherical region structure.

11. The method of claim 9, wherein the composite video track is composed based on tracks selected from a plurality of two-dimensional tile tracks, wherein each two-dimensional tile track is associated with a quality, an encryption mode, or both.

12. An apparatus configured to decode video data, the apparatus comprising a processor in communication with memory, the processor being configured to execute instructions stored in the memory that cause the processor to:

receive video data comprising a region of interest;

identify a spherical region structure associated with the video data that specifies the region of interest on a sphere, the spherical region structure comprising:

a reference point of the region of interest on the sphere;

data indicative of a set of side points, comprising a side point for each side of the region of interest on the sphere, wherein the data comprises:

a width between a first side point and a second side point from the set of side points, wherein the first and second side points are each associated with a respective different vertical boundary of the region of interest; and a height between a third side point and a fourth side point from the set of side points, wherein the third and fourth side points are each associated with a respective different horizontal boundary of the region of interest; and determine the region of interest in the video data based on the reference point and the set of side points, comprising:

determining the first side point and the second side point based on the reference point and half of the width; and determining the third side point and the fourth side point based on the reference point and half of the height.

13. An encoding method for encoding video data, the method comprising:

encoding video data comprising a region of interest, comprising generating a spherical region structure that specifies the region of interest on a sphere, the spherical region structure comprising:
- a reference point of the region of interest on the sphere;
- data indicative of a set of side points, comprising a side point for each side of the region of interest on the sphere, wherein the data comprises:
  - a width between a first side point and a second side point from the set of side points, wherein the first and second side points are each associated with a respective different vertical boundary of the region of interest, and the first side point and the second side point are specified based on the reference point and half of the width; and
  - a height between a third side point and a fourth side point from the set of side points, wherein the third and fourth side points are each associated with a respective different horizontal boundary of the region of interest, and the third side point and the fourth side point are specified based on the reference point and half of the height; and associating the spherical region structure with the video data to specify the region of interest in the video data.

14. The method of claim 13, further comprising signaling at least a portion of the spherical region structure in a timed metadata track, such that a track reference box in the timed metadata track associates the portion of the spherical region structure with the video data.

15. The method of claim 13, wherein:
- encoding the video data comprises encoding a composite video track; and
- associating the spherical region structure with the video data comprises:
  - generating metadata for the spherical region structure; and
  - associating the generated metadata with the composite video track.

16. The method of claim 15, wherein generating the metadata comprises generating a timed metadata track with metadata associated with the spherical region structure.

17. The method of claim 15, wherein encoding the composite video track comprises encoding the composite video track based on tracks selected from a plurality of two-dimensional tile tracks, wherein each two-dimensional tile track is associated with a quality, an encryption mode, or both.

18. An apparatus for encoding video data, the apparatus comprising a processor in communication with memory, the processor being configured to execute instructions stored in the memory that cause the processor to:
- encode video data comprising a region of interest, comprising generating a spherical region structure that specifies the region of interest on a sphere, the spherical region structure comprising:
  - a reference point of the region of interest on the sphere;
  - data indicative of a set of side points, comprising a side point for each side of the region of interest on the sphere, wherein the data comprises:
    - a width between a first side point and a second side point from the set of side points, wherein the first and second side points are each associated with a respective different vertical boundary of the region of interest, and the first side point and the second side point are specified based on the reference point and half of the width; and
    - a height between a third side point and a fourth side point from the set of side points, wherein the third and fourth side points are each associated with a respective different horizontal boundary of the region of interest, and the third side point and the fourth side point are specified based on the reference point and half of the height; and
- associating the spherical region structure with the video data to specify the region of interest in the video data.

\* \* \* \* \*